(12) United States Patent
Taguchi et al.

(10) Patent No.: US 6,248,253 B1
(45) Date of Patent: *Jun. 19, 2001

(54) HEXAGONAL FERRITE MAGNETS

(75) Inventors: Hitoshi Taguchi, Chiba; Kiyoyuki Masuzawa, Shizuoka; Yoshihiko Minachi, Chiba; Kazumasa Iida, Iwate, all of (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/272,338

(22) Filed: Mar. 19, 1999

(30) Foreign Application Priority Data

Jun. 25, 1998 (JP) ................................. 10-194951

(51) Int. Cl.$^7$ ................................................ C04B 35/40
(52) U.S. Cl. ..................................... 252/62.63; 252/62.59
(58) Field of Search ............................. 252/62.57, 62.61

(56) References Cited

U.S. PATENT DOCUMENTS

| 3,723,587 | 3/1973 | Iwase et al. ........................... 264/61 |
| 5,607,615 | 3/1997 | Taguchi et al. .................... 252/62.63 |
| 5,648,039 | 7/1997 | Taguchi et al. ...................... 264/425 |
| 5,811,024 | 9/1998 | Taguchi et al. .................... 252/62.63 |
| 5,846,449 | 12/1998 | Taguchi et al. .................... 252/62.62 |
| 5,945,028 | * 8/1999 | Taguchi et al. .................... 252/62.56 |
| 5,951,937 | * 9/1999 | Taguchi et al. ...................... 264/427 |
| 6,086,781 | * 7/2000 | Taguchi et al. .................... 252/62.57 |

FOREIGN PATENT DOCUMENTS

| 29-5139 | 8/1954 | (JP) . |
| 60-63715 | 4/1985 | (JP) . |
| 61-131230 | 6/1986 | (JP) . |
| 62-119760 | 6/1987 | (JP) . |
| 9-115715 | 5/1997 | (JP) . |
| 10-149910 | 6/1998 | (JP) . |
| 11-195517 | 7/1999 | (JP) . |
| 11-340022 | 12/1999 | (JP) . |

OTHER PUBLICATIONS

"Microsyntactic Intergrowth and Defects in Barium Ferrite Compounds" Y. Hirotsu and H. Sato Journal of Solid State Chemistry, vol. 26, pp. 1–16 (1978) (cited in p. 7).

"Investigation of Ferrimagnets with the Structure of Magnetoplumbite and Garnet in Strong Pulse Magnetic Fields" G.A. Smolenskii & A.A. Andreev Institute of Semiconductors, Academy of Sciences of the USSR (pp. 1405–1408). Bulletin of the Academy of sciences of the USSR vol. 25, 1961.

Report by Nanjing University 5(1979)44).

* cited by examiner

Primary Examiner—C. Melissa Koslow
(74) Attorney, Agent, or Firm—Oblon, Spivak, McClelland, Maier & Neustadt, P.C.

(57) ABSTRACT

An object of the invention is to simultaneously increase the saturation magnetization and magnetic anisotropy of M type ferrite, thereby realizing a hexagonal ferrite magnet having a high remanence and high coercivity which could never be achieved in prior art M type hexagonal ferrite magnets. The object is attained by a hexagonal ferrite magnet comprising A, R, and Fe, wherein A represents at least one element selected from among Sr, Ba, and Ca, and R represents an element capable of assuming a valence of +3 or +4 and having an ionic radius of at least 1.00 angstrom, and n/N is up to 0.35 provided that N is the total number of crystal grains and n is the number of crystal grains having stacking faults.

20 Claims, 24 Drawing Sheets

FIG·3

DI 15-2 (PRE-ADDITION) a-PLANE STRUCTURE 1/2

1 μm

D115-2(PRE-ADDITION) a-PLANE STRUCTURE 2/2

1 μm

DA 2-2(POST-ADDITION) a-PLANE STRUCTURE 1/2

1 μm

DA2-2(POST-ADDITION)a-PLANE STRUCTURE 2/2

DA 2-2 (POST-ADDITION) a-PLANE CRYSTAL GRAIN BOUNDARY

DA 2-2 (POST-ADDITION) a-PLANE CRYSTAL GRAIN INTERIOR

DA 2-2 (GRAIN 1)

DA 2-2 (GRAIN 3)

500nm

DI 15-2 (PRE-ADDITION) a-PLANE TRIPLE POINT

LaZn- SUBSTITUED Sr FERRITE (CI A-2)

1 μm

LaZn-SUBSTITUED Sr FERRITE (Cl A-2)

1 μm

HEXAGONAL FERRITE MAGNETS

TECHNICAL FIELD

This invention relates to a hexagonal ferrite magnet suitable for use as a permanent magnet material in automotive motors etc., and more particularly, to a hexagonal ferrite magnet having a magnetoplumbite structure.

BACKGROUND ART

Currently, hexagonal strontium and barium ferrites of the magnetoplumbite type (M type) are mainly used as oxide permanent magnet materials and they are manufactured into sintered magnets and bonded magnets.

Very important magnet properties are remanence or residual magnetic flux density (Br) and intrinsic coercivity (HcJ).

The remanence (Br) of a magnet is determined by the density, degree of orientation, and saturation magnetization ($4\pi Is$) which is determined by the crystalline structure. Br is thus expressed as Br=$4\pi Is$ x degree of orientation x density. Strontium and barium ferrites of the M type have a $4\pi Is$ value of about 4.65 kG. The density and degree of orientation are limited to about 98% of the theory at maximum even in the case of sintered magnets providing the highest values of density and orientation. Therefore, the Br of these magnets is limited to about 4.46 kG. It is impossible in a substantial sense to obtain a Br of higher than 4.5 kG.

The inventors found in JP-A 9-115715 that by adding a proper amount of La and Zn, for example, to M type ferrite, the $4\pi Is$ can be increased about 200 G at maximum. As a result, a Br value of higher than 4.5 kG is obtainable. However, since this was achieved at the sacrifice of anisotropy field ($H_A$) to be described later, it was difficult to acquire a Br of at least 4.5 kG and a HcJ of at least 3.5 kOe at the same time.

HcJ is proportional to the product ($H_A$xfc) of an anisotropy field ($H_A=2K_1/Is$) and a proportion (fc) of single domain particles. It is noted that $K_1$ is a crystal magnetic anisotropy constant which is determined by the crystalline structure as is Is. $K_1$ is equal to $3.3\times10^6$ erg/cm$^3$ for M type barium ferrite and $3.5\times10^6$ erg/cm$^3$ for M type strontium ferrite. The M type strontium ferrite is known to have the highest value of $K_1$ while it is difficult to further increase $K_1$.

Provided that N is a diamagnetic field coefficient which is determined by the shape of particles, as N becomes greater, a greater diamagnetic field is applied to particles to deteriorate HcJ as seen from the following formula (1).

$$HcJ (2K_1/Is-NIs) \quad (1)$$

In general, as the aspect ratio of particles becomes greater (particles become flattened), N becomes greater and HcJ becomes deteriorated.

On the other hand, if ferrite particles are in single magnetic domain state, maximum HcJ is expectable because the magnetization must be rotated against the anisotropy field in order to reverse the magnetization. In order that ferrite particles become single magnetic domain particles, the size of ferrite particles must be reduced equal to or less than the critical diameter (dc) given by the equation:

$$dc=2(k \cdot Tc \cdot K_1/a)^{1/2}/Is^2$$

wherein k is the Boltzmann constant, Tc is a Curie temperature, and a is a distance between iron ions. Since dc is equal to about 1 μm for M type strontium ferrite, a sintered body must be controlled to a crystal grain diameter of 1 μm or less when a sintered magnet is to be fabricated, for example. Although it was difficult in the prior art to realize such fine crystal grains at the same time as the achievement of a high density and high degree of orientation for providing high Br, the inventors proposed a new preparation method in JP-A 6-53064, achieving high properties that were not found in the prior art. Even with this method, however, HcJ is about 4.0 kOe when Br is 4.4 kG. It was thus difficult to acquire a high HcJ of at least 4.5 kOe while maintaining a high Br of at least 4.4 kG.

Also, in order to control the sintered body to a crystal grain diameter of 1 μm or less, the particle size in the shaping stage must preferably be 0.5 μm or less when grain growth in the sintering stage is taken into account. The use of such fine particles generally gives rise to a problem of reduced productivity due to an increase of the shaping time and increased cracks during shaping. It was very difficult to find a good compromise between property and productivity improvements.

On the other hand, it is known in the art that the addition of $Al_2O_3$ or $Cr_2O_3$ is effective for achieving high HcJ. In this case, a high HcJ of at least 4.5 kOe is obtainable since $Al^{3+}$ or $Cr^{3+}$ substitutes for $Fe^{3+}$ having "upward" spin in the M type structure and thus serves for increasing $H_A$ and suppressing grain growth. However, Is declines and the sintered density tends to decline, resulting in a substantial drop of Br. As a consequence, a composition ensuring a HcJ of 4.5 kOe provides only a Br of about 4.2 kG at maximum.

DISCLOSURE OF THE INVENTION

An object of the invention is to provide a hexagonal ferrite magnet having a high remanence and high coercivity which could never be achieved in prior art M type hexagonal ferrite magnets, by simultaneously increasing the saturation magnetization and magnetic anisotropy of M type ferrite.

This and other objects are attained by any one of the constructions defined below as (1) to (18).

(1) A hexagonal ferrite magnet comprising A, R, and Fe, wherein A represents at least one element selected from the group consisting of strontium, barium, and calcium, and R represents an element capable of assuming a valence of +3 or +4 and having an ionic radius of at least 1.00 angstrom,
    provided that N is the total number of crystal grains and n is the number of crystal grains having stacking faults, n/N is up to 0.35.

(2) The hexagonal ferrite magnet of (1) further comprising M which represents an element having an ionic radius of up to 0.90 angstrom.

(3) The hexagonal ferrite magnet of (1) which contains 0.05 to 10 at % of R.

(4) The hexagonal ferrite magnet of (2) wherein the proportions of the respective metal elements A, R, Fe, and M, each in total, are:
    A: 1 to 13 at %,
    R: 0.05 to 10 at %,
    Fe: 80 to 95 at %, and
    M: 0.1 to 5 at %,
based on the entire amount of the metal elements.

(5) The hexagonal ferrite magnet of (2) wherein a portion of stacking fault has a higher content of element M than the remaining portion of each crystal grain.

(6) The hexagonal ferrite magnet of (1) wherein R is at least one element selected from the group consisting of La, Pr, Nd, and Ce.

(7) The hexagonal ferrite magnet of (2) wherein M is an element capable of forming a divalent ion.

(8) The hexagonal ferrite magnet of (2) wherein M is at least one element selected from the group consisting of Co, Ni, and Zn.

(9) The hexagonal ferrite magnet of (1) which is a magnetoplumbite type ferrite.

(10) A hexagonal ferrite magnet comprising A, R, and Fe, wherein A represents at least one element selected from the group consisting of strontium, barium, and calcium, and R represents an element capable of assuming a valence of +3 or +4 and having an ionic radius of at least 1.00 angstrom, more R is present in proximity to grain boundaries than at the center of crystal grains.

(11) The hexagonal ferrite magnet of (10) further comprising M which represents an element having an ionic radius of up to 0.90 angstrom.

(12) The hexagonal ferrite magnet of (11) wherein more M is present in proximity to grain boundaries than at the center of crystal grains.

(13) The hexagonal ferrite magnet of (10) which contains 0.05 to 10 at % of R.

(14) The hexagonal ferrite magnet of (11) wherein the proportions of the respective metal elements A, R, Fe, and M, each in total, are:

A: 1 to 13 at %,
R: 0.05 to 10 at %,
Fe: 80 to 95 at %,
M: 0.1 to 5 at %,
based on the entire amount of the metal elements.

(15) The hexagonal ferrite magnet of (10) wherein R is at least one element selected from the group consisting of La, Pr, Nd, and Ce.

(16) The hexagonal ferrite magnet of (11) wherein M is an element capable of forming a divalent ion.

(17) The hexagonal ferrite magnet of (11) wherein M is at least one element selected from the group consisting of Co, Ni, and Zn.

(18) The hexagonal ferrite magnet of (10) which is a magnetoplumbite type ferrite.

OPERATION

Of properties of hexagonal ferrite magnets, HcJ is generally noticeably smaller than the value expected from the single domain particle theory. One of the causes is that the particle size is greater than the single domain critical diameter although there remain many cases that cannot be explained solely by the size.

Carefully observing a sintered body under TEM, the inventors have found that among crystal grains 1, some have stacking faults 2 in planes transverse to c-axis as shown in FIG. 25. In FIG. 25, an arrow c designates the direction of c-axis.

As described, for example, in Japanese Patent application No. 9-56856 (International Publication WO 98/38654) and JP-A 10-149910, M type strontium ferrite compositions in which $La^{3+}$ and $Co^{2+}$ substitute for $Sr^{2+}$ and $Fe^{3+}$, respectively, exhibit high properties because both the saturation magnetization and crystal magnetic anisotropy constant ($K_1$) which are fundamental magnetic properties dependent on the crystal structure are increased. However, the inventors first found that if such a hexagonal ferrite magnet of the composition substituted with elements having a different valence or different ionic radius is prepared by a conventional method, there is a likelihood of inducing stacking faults. The inventors also found a probability that because of stacking faults, the high crystal magnetic anisotropy is not fully reflected by coercivity which is one of magnet properties.

The inventors found in Japanese Patent Application No. 9-273936 that satisfactory magnetic properties are obtained by the preparation method (post-addition method) disclosed therein and the ferrite magnet prepared by this method have two Curie temperatures. Continuing the research, the inventors have found that stacking faults are significantly reduced in this situation. The present invention is predicated on this finding.

Further, the effective means for reducing stacking faults is to make R surplus. Also effective is a preparation method involving the step of firing hexagonal ferrite in an oxygen excessive atmosphere, specifically an atmosphere having an oxygen partial pressure in excess of 0.2 atm., as described in Japanese Patent Application No. 9-273932.

Hexagonal ferrites like ferrites of the magnetoplumbite structure have the structure that oxygen ions ($O^{2-}$) are stacked like ABAB . . . in the hexagonal closest packing and some of the oxygen ions are replaced by $Sr^{2+}$, $Ba^{2+}$, $Ca^{2+}$, etc. And ions of a smaller size such as iron ions ($Fe^{3+}$) are positioned at interstices in a layer formed of $O^{2-}$ and $Sr^{2+}$. In general, stacking faults are plane defects where the sequence of stacking like ABAB . . . is partially disordered. The stacking faults as used herein are described in further detail.

As shown in FIG. 1, M type hexagonal ferrite has a structure of alternating S and R layers like the sequence of S layer/R layer/S* layer/R* layer. Herein, S* and R* mean that S and R are rotated 180 degrees about c-axis. The Experiment (TEM-EDS analysis) shown later suggests a high possibility that stacking fault is an abnormal growth of the S layer (spinel layer) portion. This is designated "intergrowth layer" as described, for example, in Journal of Solid State Chemistry, vol. 26, pp. 1–6 (1978).

It was first discovered by the inventors that hexagonal ferrite having R and M incorporated therein contains more stacking faults and superior properties are obtained by reducing the number of stacking faults. Although it is ideal to reduce stacking faults to nil, the inventors have found that superior properties are obtained when n/N is in the range from 0.05 to 0.35 provided that N is the total number of crystal grains and n is the number of crystal grains having stacking faults.

The reason why a ferrite magnet shows inferior magnetic properties when stacking faults are present is presumed as follows. First, when stacking faults are positioned within a nonmagnetic layer, it is believed that crystal grains are magnetically divided. This is, in a substantial sense, equal to flattening of grains, resulting in an increase of diamagnetic field coefficient (N) and a decline of HcJ in accordance with formula (1) above. Secondly, when stacking faults are positioned in a spinel layer exhibiting soft magnetism, it is believed that the soft magnetic layer forms a closed magnetic circuit, resulting in a decline of the effective crystal magnetic anisotropy.

The inventors found in the preceding Japanese Patent Application No. 9-273936 that satisfactory magnetic properties are obtained by the preparation method (post-addition method) disclosed therein and the ferrite magnet prepared by this method have two Curie temperatures. It was first discovered that among the elements post-added in this method, the concentration of element R such as La is low at the center of crystal grains, but relatively high in proximity to grain boundaries and at the triple point.

It was also found that the distribution of element M such as Co is like element R although element M, if present in a minor amount, is difficult to analyze and determined indefinite.

The reason why a ferrite magnet having excellent magnetic properties is obtained by assuming the structure in which element R such as La and element M such as Co are present in higher concentrations in proximity to grain boundaries than in proximity to the center of crystal grains is presumed as follows. First, it is known that strontium ferrite containing La and Co has a great crystal magnetic anisotropy. It is then believed that if these elements are present in higher concentrations in proximity to grain boundaries, a magnetic phase having great anisotropy is present in proximity to grain boundaries. It is known that high coercivity is available from such a structure partially because the formation of inverse magnetic domains is restrained. Secondly, there are less stacking faults due to the low concentrations of R and Co at the center of crystal grains.

BEST MODE FOR CARRYING OUT THE INVENTION

Figure 1:
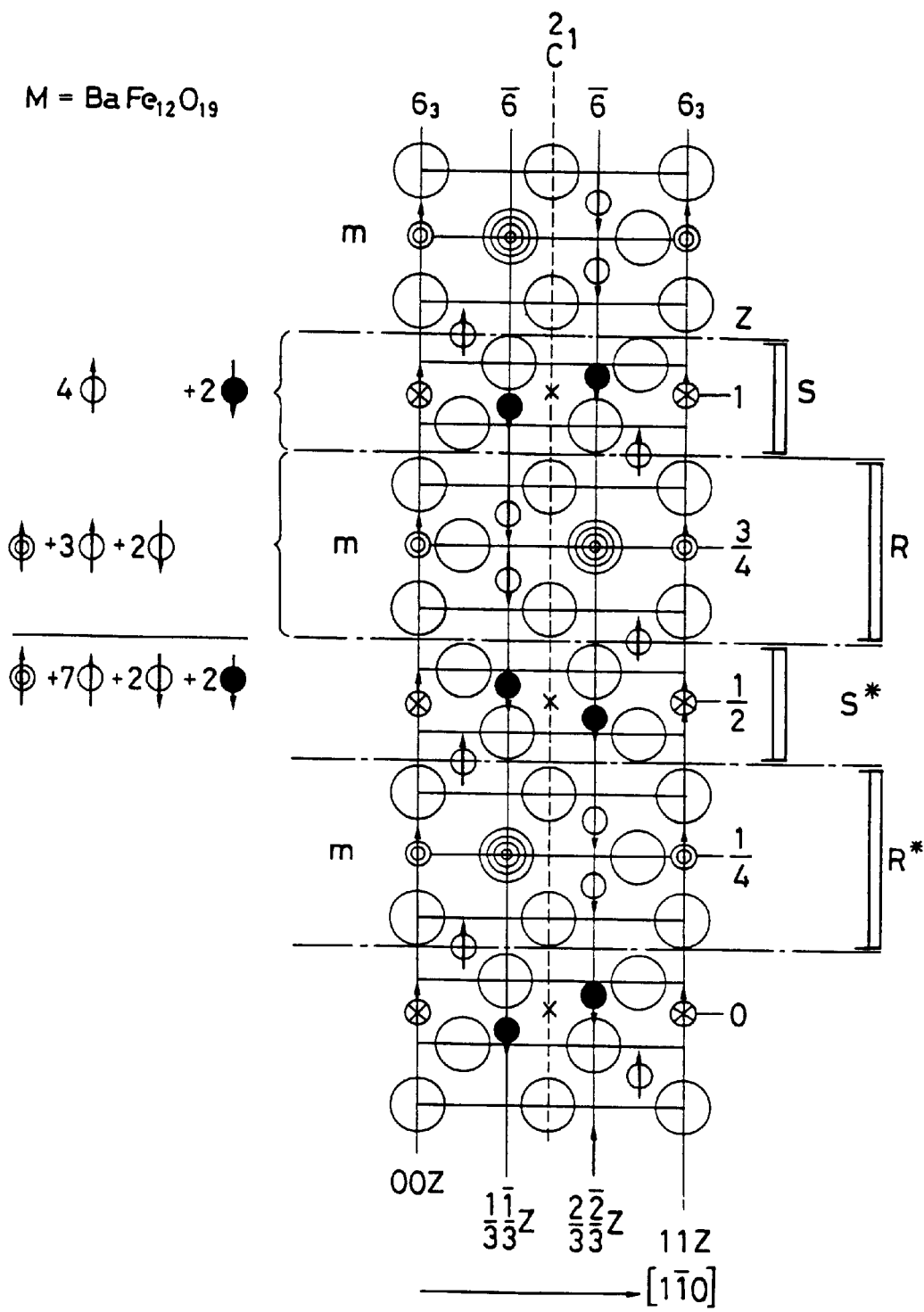
FIG. 1 is a diagram showing the crystal structure of a hexagonal ferrite magnet according to the invention.

The hexagonal ferrite magnet of the invention contains A, R, and Fe, wherein A represents at least one element selected from the group consisting of strontium Sr, barium Ba, and calcium Ca, and R represents an element capable of assuming a valence of +3 or +4 and having an ionic radius of at least 1.00 angstrom. Provided that N is the total number of crystal grains and n is the number of crystal grains having stacking faults formed transverse to c-axis, n/N is up to 0.35, and especially from 0.05 to 0.35. By restricting the number of crystal grains having stacking faults below the specific value relative to the total number of crystal grains, excellent magnetic properties are obtained.

Although stacking faults can be relatively readily identified by TEM or similar technique, it is not practical to count the number of crystal grains throughout the magnet. Therefore, for example, when a surface (a-plane) parallel to c-axis of an anisotropic sintered magnet is observed under a transmission electron microscope (TEM), the number of crystal grains within a certain field of view is counted. Assuming that the total number of crystal grains within this field is N and the number of crystal grains having stacking faults found among the crystal grains is n, the actual numbers are estimated from these numbers. The TEM used herein for observation should preferably have a magnification of 1,000× to 100,000×, and especially 10,000× to 20,000×. The number of fields of view is preferably at least 2 fields, especially 2 to 10 fields so that N may range from about 20 to about 500. It is noted that the number of faults in a crystal grain is usually about one or about two although three or more faults are present in some cases.

The hexagonal ferrite magnet of the invention contains A, R, and Fe, wherein A represents at least one element selected from among strontium, barium, and calcium, and R represents an element capable of assuming a valence of +3 or +4 and having an ionic radius of at least 1.00 angstrom. More R is present in proximity to grain boundaries than at the center of crystal grains. This structure ensures excellent magnetic properties.

This structure may be regarded similar to the "core-shell structure" as found in such dielectric materials as barium titanate. And this structure can be identified by TEM-EDS analysis.

In order to form a hexagonal ferrite, ions of R should have a size approximate to oxygen ions ($O^{2-}$), specifically a size of about 1.00 to 1.60 angstroms. Also, ions of M should have a size smaller than oxygen ions ($O^{2-}$) and approximate to iron ions ($Fe^{3+}$), specifically a size of about 0.50 to 0.90 angstroms.

It suffices that the hexagonal ferrite magnet of the invention contains A, R, and Fe, and other additives are not critical. Preferably, the magnet contains A, R, Fe, and M provided that A represents at least one element selected from among strontium, barium, and calcium, R represents an element capable of assuming a valence of +3 or +4 and having an ionic radius of at least 1.00 angstrom, especially 1.00 to 1.60 angstroms, and M represents an element having an ionic radius of up to 0.90 angstrom, especially 0.50 to 0.90 angstrom.

Further preferably, the proportions of the respective metal elements A, R, Fe, and M, each in total, are:

A: 1 to 13 at %,
R: 0.05 to 10 at %,
Fe: 80 to 95 at %, and
M: 0.1 to 5 at %, based on the entire amount of the metal elements.

The more preferred range is
A: 3 to 11 at %,
R: 0.2 to 6 at %,
Fe: 83 to 94 at %, and
M: 0.3 to 4 at %.

The further preferred range is
A: 3 to 9 at %,
R: 0.5 to 4 at %,
Fe: 86 to 93 at %, and
M: 0.5 to 3 at %.

Among the constituent elements, A is at least one element selected from among strontium, barium, and calcium. If A is too small, no M type ferrite would form or more nonmagnetic phases such as $\alpha$-$Fe_2O_3$ would form. If A is too large, no M type ferrite would form or more nonmagnetic phases such as $SrFeO_{3-x}$ would form. The proportion of strontium in A is preferably at least 51 at %, more preferably at least 70 at %, and most preferably 100 at %. If the proportion of strontium in A is too low, it would become impossible to acquire both an improvement in saturation magnetization and a significant improvement in coercivity.

R is preferably lanthanum (La), neodymium (Nd), praseodymium (Pr) or cerium (Ce). If R is too small, the amount of solid solution of M becomes smaller, failing to achieve the effect of the invention. If R is too large, more nonmagnetic hetero-phases such as ortho-ferrite would form. The proportion of lanthanum in R is preferably at least 40 at %, and more preferably at least 70 at %. For improved saturation magnetization, it is most preferable to use only lanthanum as R. This is because lanthanum is the highest when the limit of R forming solid solution with hexagonal M type ferrite is compared. Therefore, if the proportion of lanthanum in R is too low, the amount of solid solution of R cannot be increased and as a consequence, the amount of solid solution of M cannot be increased too, mitigating the effect of the invention.

Element M is preferably cobalt (Co), nickel (Ni) or zinc (Zn). If M is too small, the effect of the invention is obtained with difficulty. If M is too large, Br and HcJ rather lower and the effect of the invention is obtained with difficulty. The proportion of cobalt in M is preferably at least 10 at %, more preferably at least 20 at %. If the proportion of cobalt is too low, the improvement in coercivity becomes insufficient.

Herein, the contents of R and M are correlated to the number of faulty crystal grains. There is a tendency that as the contents of R and M increase, the number of faulty crystal grains increases. It is noted that the number of faulty crystal grains also decreases when R is more than the stoichiometry.

Also preferably, the hexagonal magnetoplumbite type ferrite is represented by the formula (2):

$$A_{1-x}R_x(Fe_{12-y}M_y)_zO_{19} \tag{2}$$

wherein $0.04 \leq x \leq 0.9$, especially $0.04 \leq x \leq 0.6$,
$0.04 \leq y \leq 0.5$,
$0.8 \leq x/y \leq 5$, and
$0.7 \leq z \leq 1.2$.

The more preferred range is:
$0.04 \leq x \leq 0.5$,
$0.04 \leq y \leq 0.5$,
$0.8 \leq x/y \leq 5$, and
$0.7 \leq z \leq 1.2$.

The further preferred range is:
$0.1 \leq x \leq 0.4$,
$0.1 \leq y \leq 0.4$, and
$0.8 \leq z \leq 1.1$, especially $0.9 \leq z \leq 1.05$.

In formula (2), with too smaller values of x indicating smaller amounts of element R, the amount of solid solution of element M with the hexagonal ferrite cannot be increased, leading to less improvements in saturation magnetization and/or anisotropic magnetic field. With too larger values of x, element R cannot substitute or form a solid solution in the hexagonal ferrite, forming an ortho-ferrite containing element R to detract from saturation magnetization. Too smaller values of y lead to less improvements in saturation magnetization and/or anisotropic magnetic field. With too larger values of y, element M cannot substitute or form a solid solution in the hexagonal ferrite, and substantial losses of anisotropy constant ($K_1$) and anisotropy field ($H_A$) occur even when element M can substitute and form a solid solution. Too smaller values of z increase the amount of a nonmagnetic phase containing strontium and element R to detract from saturation magnetization. Too larger values of z increase the amount of $\alpha$-$Fe_2O_3$ phase or nonmagnetic spinel ferrite phase containing element M, also lowering saturation magnetization. It is understood that the above formula is prescribed provided that no impurities are contained.

If x/y is outside the range in formula (2), an equilibrium in valence would not be established between elements R and M, with a likelihood to form hetero-phases such as W type ferrite. Since element M is divalent, the relation of x to y is ideally x/y=1 when element R is a trivalent ion. The reason why the permissible range of x/y is greater when x/y is in excess of 1 is that an equilibrium in valence is established through reduction of $Fe^{3+}$ to $Fe^{2+}$ even if y is small.

In formula (2) representing the composition, the number of oxygen (O) atoms is 19, which stands for the stoichiometric compositional ratio given when all Rs are trivalent, x=y, and z=1. The number of oxygen atoms varies with the type of R and the values of x, y, and z. There is also a possibility that oxygen vacancies be left when the firing atmosphere is reducing, for example. Furthermore, although iron is usually trivalent in the M type ferrite, there is a possibility that iron change to divalent or different valence form. There is also a possibility that the element represented by M such as cobalt change its valence. With these variances, the proportion of oxygen to the metal elements varies. Although it is assumed throughout the specification that the number of oxygen atoms is 19 independent of the type of R and the values of x, y, and z, the actual number of oxygen atoms may somewhat deviate from the stoichiometric compositional ratio.

The composition of ferrite can be measured by fluorescent X-ray quantitative analysis, for example. The presence of the above-described major phase is confirmed by x-ray diffractometry, electron diffractometry, etc.

Boron oxide $B_2O_3$ may be contained in the magnet powder. Inclusion of $B_2O_3$ is effective for lowering the calcining and sintering temperatures, which is advantageous in manufacture. The content of $B_2O_3$ is preferably up to 0.5% by weight of the entire magnet powder. Too high contents of $B_2O_3$ would lower saturation magnetization.

The magnet powder may contain at least one of sodium Na, potassium K, and rubidium Rb. The total content of Na, K, and Rb is preferably up to 3% by weight of the entire magnet powder when they are calculated as $Na_2O$, $K_2O$, and $Rb_2O$, respectively. Too large contents of these elements would lower saturation magnetization. Provided that these elements are represented by $M'$, the ferrite contains $M'$, for example, in the form of

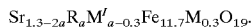

$$Sr_{1.3-2a}R_aM'_{a-0.3}Fe_{11.7}M_{0.3}O_{19}.$$

Preferably, letter $\underline{a}$ is $0.3 < a \leq 0.5$. Too larger values of $\underline{a}$ would give rise to problems that the saturation magnetization lowers and more of element $M'$ evaporates during firing.

In addition to the above impurities, there may be contained, for example, Si, Al, Ga, In, Li, Mg, Mn, Ni, Cr, Cu, Ti, Zr, Ge, Sn, V, Nb, Ta, Sb, As, W, and Mo in oxide form, specifically in approximate amounts of up to 1% by weight of silicon oxide, up to 5% by weight of aluminum oxide, up to 5% by weight of gallium oxide, up to 3% by weight of indium oxide, up to 1% by weight of lithium oxide, up to 3% by weight of magnesium oxide, up to 3% by weight of manganese oxide, up to 3% by weight of nickel oxide, up to 5% by weight of chromium oxide, up to 3% by weight of copper oxide, up to 3% by weight of titanium oxide, up to 3% by weight of zirconium oxide, up to 3% by weight of germanium oxide, up to 3% by weight of tin oxide, up to 3% by weight of vanadium oxide, up to 3% by weight of niobium oxide, up to 3% by weight of tantalum oxide, up to 3% by weight of antimony oxide, up to 3% by weight of arsenic oxide, up to 3% by weight of tungsten oxide, and up to 3% by weight of molybdenum oxide.

The hexagonal ferrite magnet of the invention preferably has at least two different Curie temperatures Tc1 and Tc2. These two different Curie temperatures Tc1 and Tc2 are in the range of 400 to 470° C., and the difference between Tc1 and Tc2 is at least 5° C. in absolute value. The presence of two different Curie temperatures leads to a significant improvement in squareness Hk/HcJ.

The Curie temperature can be determined from a variable point on the magnetization-temperature (σ-T) curve of a magnet. More illustratively, following the conventional procedure, the Curie temperature is determined as the temperature at the intersection with the temperature axis of a tangent to the lower-temperature side curve at a variable point on the σ-T curve. The difference between two different Curie temperatures Tc1 and Tc2 is at least 5° C., preferably at least 10° C. in absolute value. The upper limit of Curie temperature is about 465° C. though not critical. These Curie temperatures are in the range of 400 to 470° C., preferably 430 to 460° C. The two different Curie temperatures appear because the texture structure of ferrite crystals according to the invention has a structure of two magnetically different M type ferrite phases as a result of its manufacturing process to be described later and the like. Understandably, only the M phase is detected as a single phase by conventional x-ray diffractometry.

The squareness Hk/HcJ is preferably at least 90%, more preferably at least 92%. It reaches 95% at maximum. Also the magnet of the invention preferably has a degree of orientation Ir/Is of at least 96.5%, more preferably at least 97%. It reaches about 98% at maximum. The increased degree of orientation leads to higher Br. In the case of a compact, since the degree of magnetic orientation is also affected by the compact density, important is the degree of crystallographic orientation (degree of x-ray orientation) of the compact as determined from the face indices and intensities of peaks developed when measurement is made on a surface of the compact by x-ray diffractometry. The degree of x-ray orientation of the compact governs the degree of magnetic orientation of a sintered body to a considerable extent. Preferably, the degree of x-ray orientation is represented by $\Sigma I(00L)/\Sigma I(hkL)$. (00L) generally designates c-planes such as (004) and (006), and $\Sigma I(00L)$ is the sum of all the peak intensities of (00L) planes. (hkL) designates all peaks detected, and $\Sigma I(hkL)$ is the sum of these intensities. Therefore, $\Sigma I(00L)/\Sigma I(hkL)$ represents the degree of c-plane orientation. This $\Sigma I(00L)/\Sigma I(hkL)$ preferably has a value of at least 0.85, and more preferably at least 0.9 while its upper limit is about 1.0.

Next, a method for preparing a ferrite sintered magnet is described.

The ferrite sintered magnet is prepared using as powder stock materials a powder compound containing A which is Sr, Ba or Ca, a powder compound containing R which is an element capable of assuming a valence of +3 or +4 and having an ionic radius of at least 1.00 angstrom, preferably La, Pr, Nd or Ce, and a powder compound containing M which is an element having an ionic radius of up to 0.90 angstrom, preferably Co, Ni or Zn. A mixture of at least one of these powder stock materials with a powder of an oxide containing Fe is calcined. To the calcined mixture is added and mixed at least one powder stock material selected from a powder compound containing A which is Sr, Ba or Ca, a powder compound containing R which is an element capable of assuming a valence of +3 or +4 and having an ionic radius of at least 1.00 angstrom, preferably La, Pr, Nd or Ce, and a powder compound containing M which is an element having an ionic radius of up to 0.90 angstrom, preferably Co, Ni or Zn. The resulting mixture is fired. The powder compound containing A which is Sr, Ba or Ca, the powder compound containing R which is an element capable of assuming a valence of +3 or +4 and having an ionic radius of at least 1.00 angstrom, preferably La, Pr, Nd or Ce, and the powder compound containing M which is an element having an ionic radius of up to 0.90 angstrom, preferably Co, Ni or Zn, used as the powder stock materials, may be oxides or compounds which convert into oxides upon firing, for example, carbonates, hydroxides and nitrates. The mean particle diameter of the powder stock materials is not critical although among others, iron oxide is preferably in the form of a fine powder whose primary particles preferably have a mean particle diameter of up to 1 $\mu$m, especially up to 0.5 $\mu$m. In addition to the above-described powder stock materials, $B_2O_3$ and other compounds, for example, compounds containing Si, Al, Ga, In, Li, Mg, Mn, Ni, Cr, Cu, Ti, Zr, Ge, Sn, V, Nb, Ta, Sb, As, W, and Mo may be contained as additives or impurities such as incidental components, if necessary.

Calcination may be made in air, for example, at 1,000 to 1,350° C. for about 1 second to about 10 hours, especially about 1 second to about 3 hours.

The thus calcined body has a ferrite structure of substantially the magnetoplumbite type and its primary particles preferably have a mean particle diameter of up to 2 µm, more preferably up to 1 µm, further preferably 0.1 to 1 µm, most preferably 0.1 to 0.5 µm. The mean particle diameter may be measured by means of a scanning electron microscope.

Then, after the calcined body is pulverized or while the calcined body is being pulverized, at least one of the powder compound containing A which is Sr, Ba or Ca, the powder compound containing R which is an element capable of assuming a valence of +3 or +4 and having an ionic radius of at least 1.00 angstrom, preferably La, Pr, Nd or Ce, and the powder compound containing M which is an element having an ionic radius of up to 0.90 angstrom, preferably Co, Ni or Zn is mixed therewith. The mixture is shaped and sintered, yielding a ferrite sintered magnet. More particularly, the magnet is preferably prepared by the following procedure. The amount of the powder compound(s) added is preferably 1 to 100% by volume, more preferably 5 to 70% by volume, and especially 10 to 50% by volume of the calcined body.

The time when the compound is added is not particularly limited insofar as it is after calcination and before firing. Preferably the compound is added during the pulverizing step to be described later. The type and amount of power stock materials added are arbitrary. The same stock material may be added in divided portions before and after calcination although it is preferred that at least 30%, especially at least 50% of the entirety be added in the post step following calcination. The compound added generally has a mean particle size of about 0.1 to 2 µm.

According to the invention, wet shaping is carried out using a shaping slurry containing oxide magnetic material particles, water as a dispersing medium, and a dispersant. In order to enhance the effect of the dispersant, a wet pulverizing step preferably precedes the wet shaping step. When calcined particles are used as the oxide magnetic material particles, a dry coarse pulverizing step for coarsely pulverizing or disintegrating the calcined particles preferably precedes the wet pulverizing step because the calcined particles are generally granular. It is noted that when the oxide magnetic material particles are prepared by a co-precipitation or hydrothermal synthesis method, the dry coarse pulverizing step is generally omitted and the wet pulverizing step is not essential although the wet pulverizing step is preferably provided in order to further increase the degree of orientation. In the following description, reference is made to the embodiment wherein calcined particles are used as the oxide magnetic material particles and the dry coarse pulverizing step and wet pulverizing step are employed.

In the dry coarse pulverizing step, pulverization is generally continued until the BET specific surface area is increased by a factor of about 2 to 10. At the end of pulverization, the particles preferably have a mean particle size of about 0.1 to 1 µm and a BET specific surface area of about 4 to 10 $m^2/g$. The coefficient of variation of the particle size is preferably maintained at or below 80%, especially 10 to 70%. The pulverizing means is not critical and use may be made of, for example, dry vibratory mills, dry attritors (media agitating mills) and dry ball mills, with the dry vibratory mills being preferably used. The pulverizing time may be determined as appropriate depending on the particular pulverizing means used. It is preferred to add part of the powder stock material during the dry pulverizing step.

The dry coarse pulverization is effective for reducing coercivity HcB by introducing crystal strains into the calcined particles. The drop of coercivity restrains agglomeration of particles, improves dispersion and also improves the degree of orientation. The crystal strains in the particles are released in the subsequent sintering step whereby a permanent magnet is obtainable.

It is noted that during dry coarse pulverization, $SiO_2$ and $CaCO_3$ which converts into CaO upon firing are generally added. Parts of $SiO_2$ and $CaCO_3$ may be added prior to calcination and in this case, some improvements in properties are ascertained.

After the dry coarse pulverization, a pulverizing slurry containing the pulverized particles and water is prepared and subjected to wet pulverization. The content of the calcined particles in the pulverizing slurry is preferably about 10 to 70% by weight. The pulverizing means used in wet pulverization is not particularly limited although ball mills, attritors and vibratory mills are preferably used in most cases. The pulverizing time may be determined as appropriate depending on the particular pulverizing means used.

At the end of wet pulverization, the pulverized slurry is concentrated into a shaping slurry. Concentration may be effected by centrifugal separation or the like. The amount of the calcined particles contained in the shaping slurry is preferably about 60 to 90% by weight.

In the wet shaping step, the shaping slurry is shaped in a magnetic field. A compacting pressure of about 0.1 to 0.5 $ton/cm^2$ and a magnetic field of about 5 to 15 kOe may be applied.

Although the use of a non-aqueous dispersing medium in the shaping slurry is preferred because a high degree of orientation is obtained, the present invention favors the use of a shaping slurry having a dispersant added to an aqueous dispersing medium. The dispersant used herein is preferably an organic compound having hydroxyl and carboxyl groups or a neutralized salt thereof or a lactone thereof, an organic compound having a hydroxymethylcarbonyl group, or an organic compound having an enol type hydroxyl group dissociable as an acid or a neutralized salt thereof.

Understandably, when the non-aqueous dispersing medium is used, it is obtained by adding a surfactant such as oleic acid to an organic solvent such as toluene or xylene as described in JP-A 6-53064. The use of such a dispersing medium allows a high degree of magnetic orientation of about 98% at maximum to be accomplished even when difficult-to-disperse ferrite particles of submicron size are used.

The above-described organic compounds are those having 3 to 20 carbon atoms, preferably 4 to 12 carbon atoms, and having hydroxyl groups attached to at least 50% of the carbon atoms other than the carbon atom forming a double bond with an oxygen atom. If the number of carbon atoms is 2 or less, the effect of the invention is not obtainable. Also, the effect of the invention is not obtainable with organic compounds of at least 3 carbon atoms, but having hydroxyl groups attached to less than 50% of the carbon atoms other than the carbon atom forming a double bond with an oxygen atom. The bonding proportion of hydroxyl groups is limited for the above-described organic compounds, but not applied to the dispersants themselves. For lactones of organic compounds having hydroxyl and carboxyl groups (i.e., hydroxycarboxylic acids) as the dispersant, for example, the limited bonding proportion of hydroxyl groups is applied to the hydroxycarboxylic acids themselves, but not to the lactones.

The basic skeleton of the above organic compounds may be chain or cyclic and be saturated or contain unsaturated bonds.

Illustratively, hydroxycarboxylic acids or neutralized salts thereof or lactones thereof are preferred as the dispersant.

Especially preferred are gluconic acid (C=6, OH=5, COOH=1) or a neutralized salt thereof or lactone thereof, lactobionic acid (C=12, OH=8, COOH=1), tartaric acid (C=4, OH=2, COOH=2) or a neutralized salt thereof, and glucoheptonic acid γ-lactone (C=7, OH=5). Of these, gluconic acid or a neutralized salt thereof or lactone thereof is preferable for the augmented effect of improving the degree of orientation and low cost.

Sorbose is preferable as the organic compound having a hydroxymethylcarbonyl group.

Ascorbic acid is preferable as the organic compound having an enol type hydroxyl group dissociable as an acid.

It is noted that citric acid or a neutralized salt thereof can be used as the dispersant in the practice of the invention. Citric acid has hydroxyl and carboxyl groups, but does not satisfy the requirement that hydroxyl groups are attached to at least 50% of the carbon atoms other than the carbon atom forming a double bond with an oxygen atom. Nevertheless, the effect of improving the degree of orientation is ascertained.

Some of the preferred dispersants described above are illustrated below by their structure.

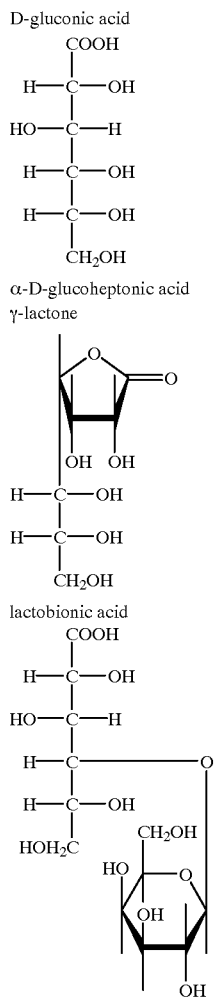

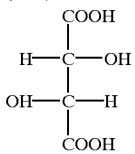

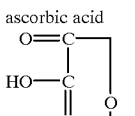

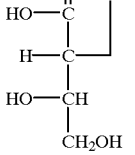

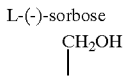

Also useful are dispersants as described in Japanese Patent Application No. 10-159927 by the applicant. More particularly, these dispersants are organic compounds in the form of saccharides having carboxyl groups or derivatives thereof or salts thereof. These dispersants are defined as having at least 21 carbon atoms.

It is noted that the slurry increases its viscosity as the molecular weight of the dispersant increases. If the viscosity of the slurry is too high, the viscosity can be reduced by such means as hydrolyzing the dispersant with enzymes or the like.

The saccharides constituting the basic skeleton of the above-described dispersants include polysaccharides such as cellulose and starch, and reduced derivatives, oxidized derivatives and dehydrated derivatives thereof, as well as another wide range of derivatives, such as aminosaccharides and thiosaccharides.

The preferred saccharides having carboxyl groups are those in which at least some of OH groups form ether bonds with organic compounds having carboxyl groups. Such preferred compounds are ethers of saccharides with glycolic acids. Illustratively, carboxymethyl cellulose or carboxymethyl starch is preferable. In these compounds, the degree of substitution of carboxymethyl groups, that is, the degree of etherification is 3 at maximum, and it is preferred that the degree of etherification is at least 0.4. Compounds with a too low degree of etherification are difficultly soluble in water. It is noted that carboxymethyl cellulose is generally synthesized in the form of a sodium salt, and that the sodium salt can be used as the dispersant in the practice of the invention although an ammonium salt is preferably used because of little deleterious influence on magnetic properties. Further, oxidized starch is a saccharide having carboxyl groups within the molecule and falls in the scope of the preferred dispersant used in the practice of the invention.

The degree of orientation achieved by magnetic field orientation is affected by the pH value of the slurry. ore particularly, at too low pH, the degree of orientation becomes lower and the remanence after sintering is affected thereby. When a compound which exhibits acid properties in an aqueous solution, for example, hydroxycarboxylic acid is used as the dispersant, the resulting slurry has a low pH. Accordingly, it is preferred to adjust the pH of the slurry as by adding a basic compound along with the dispersant. The preferred basic compounds are ammonia and sodium hydroxide. Ammonia may be added as ammonia water. The use of a sodium salt of hydroxycarboxylic acid is also effective in preventing pH lowering.

When $SiO_2$ and $CaCO_3$ are added as auxiliary components as in hexagonal ferrite magnets, the use of hydroxycarboxylic acid or a lactone thereof as the dispersant allows $SiO_2$ and $CaCO_3$ to be carried over along with the supernatant of the slurry mainly during preparation of the shaping slurry, resulting in a drop of HcJ and a loss of the desired performance. Also, if the pH of the slurry is increased as by adding the basic compound, the carry-over amount of $SiO_2$ and $CaCO_3$ is increased. By contrast, the use of a calcium salt of hydroxycarboxylic acid suppresses the carry-over of $SiO_2$ and $CaCO_3$. It is noted that when the basic compound is added or when a sodium salt is used as the dispersant, any shortage of the $SiO_2$ and CaO contents in the magnetic can be prevented by adding $SiO_2$ and $CaCO_3$ in excess of the desired composition. When ascorbic acid is used, the carry-over of $SiO_2$ and $CaCO_3$ is little ascertained.

For the above reason, the slurry is preferably at pH 7 or higher, and more preferably at pH 8 to 11.

No particular limit is imposed on the type of the neutralized salt used as the dispersant. Any of calcium, sodium and other salts may be used although a calcium salt is preferably used for the above reason. If a sodium salt is used as the dispersant or ammonia water is added, there arise problems including the carry-over of auxiliary components and a likelihood for a compact or sintered body to crack.

It is understood that a mixture of two or more dispersants may be used.

The amount of the dispersant added is preferably 0.05 to 3.0% by weight, more preferably 0.10 to 2.0% by weight based on the oxide magnetic material particles or calcined particles. Too less amounts of the dispersant would achieve an insufficient improvement in the degree of orientation. With too much amounts of the dispersant, a compact or sintered body is likely to crack.

It is noted that if the dispersant is a compound ionizable in an aqueous solution, for example, an acid or metal salt, the amount of the dispersant added is calculated as an ion. That is, the addition amount is calculated as the organic moiety with the hydrogen ion or metal ion removed. When the dispersant is a hydrate, the addition amount is calculated with the water of crystallization removed. For example, when the dispersant used is calcium gluconate monohydrate, the addition amount is calculated as a gluconate ion.

Also, when the dispersant is a lactone or contains a lactone, the addition amount is calculated as a hydroxycarboxylate ion provided that the lactone opens all its rings and converts into a hydroxycarboxylic acid.

The time when the dispersant is added is not critical. The dispersant may be added during dry coarse pulverization or during preparation of a pulverizing slurry subject to wet pulverization, or in divided portions, with one portion during dry coarse pulverization and the remaining portion during wet pulverization. Alternatively, the dispersant may be added under agitation after wet pulverization. Any of these procedures results in the shaping slurry containing the dispersant therein, with which the effect of the invention is accomplished. It is understood that a higher degree of orientation is obtainable when the dispersant is added during pulverization, especially dry coarse pulverization. It is believed that a vibratory mill used for dry coarse pulverization imparts greater energy to particles and elevates the temperature of particles higher than a ball mill used for wet pulverization, so that the particles may take a sufficient state for chemical reaction to proceed. It is thus believed that if the dispersant is added during dry coarse pulverization, a more amount of the dispersant is adsorbed on surfaces of particles and as a result, a higher degree of orientation is obtainable. In fact, on measurement of the amount of the dispersant remaining in the shaping slurry (which is deemed substantially equal to the adsorption amount), the ratio of the residual amount to the addition amount is higher when the dispersant is added during dry coarse pulverization than when the dispersant is added during wet pulverization. It is noted that in case the dispersant is added in divided portions, the amounts of respective portions are determined such that the total addition amount may fall in the preferred range.

After the shaping step, the compact is hot worked in the air or nitrogen at a temperature of 100 to 500° C. for fully decomposing off the dispersant added. In the subsequent sintering step, the compact is sintered, for example, in the air, preferably at a temperature of about 1,150 to 1,250° C., more preferably about 1,160 to 1,220° C. for about 0.5 to 3 hours, yielding an anisotropic hexagonal ferrite magnet.

The magnet of the invention preferably has a mean crystal grain size of up to 2 $\mu$m, more preferably up to 1 $\mu$m, and most preferably 0.5 to 1.0 $\mu$m. The magnet of the invention exhibits a fully high coercivity even when the mean crystal grain size is in excess of 1 $\mu$m. The crystal grain size can be measured by means of a scanning electron microscope. The resistivity is about $10^9$ $\Omega$m or higher.

It is noted that a sintered magnet can also be obtained by disintegrating the compact by a crusher or the like, classifying the granules through sieves to collect a fraction of magnetic field orienting granules having a mean particle size of about 100 to 700 $\mu$m, and dry shaping the fraction in a magnetic field, followed by sintering.

It is noted that a magnet powder can also be obtained by pulverizing the slurry of the calcined particles and drying the particles, followed by firing.

Using the hexagonal ferrite magnet of the invention, the following advantages are usually provided so that excellent applied products are obtainable. More particularly, provided that applied products are of the same shape as conventional ferrite products, the magnets, which generate a more magnetic flux density, contribute to improvements in the performance of products, for example, the achievement of higher torque in the case of motors, and the achievement of sound quality with improved linearity due to the strengthened magnetic circuit in the case of speakers or headphones. Also, if applied products may have the same function as the prior art products, the dimensions (thickness) of magnets can be reduced (thinner), contributing to size and weight reductions (flattening). Also, in the case of motors using wound electromagnets as the field magnet, the hexagonal ferrite magnets can substitute for the electromagnets, contributing to weight reduction, manufacturing process shortening and cost reduction. Because of the improved temperature properties of coercivity (HcJ), it becomes possible to use the ferrite magnets in low-temperature environments where conventional ferrite magnets have the risk of low-temperature demagnetization (permanent demagnetization). The reliability of products used in cold districts and high altitude zones is significantly improved.

The hexagonal ferrite magnet of the invention is worked into the desired shape and finds a wide variety of applications as described below.

The magnets are advantageously used in automotive motors for fuel pumps, power windows, ABS, fans, wipers, power steering, active suspensions, starters, door locks and mirrors; motors for business machines and audio-visual equipment such as FDD spindles, VCR capstans, VCR rotary heads, VCR reels, VCR loading, VCR camera capstans, VCR camera rotary heads, VCR camera zoom, VCR camera focus, tape cassette capstans, CD, LD, and MD drive spindles, CD, LD and MD loading, CD and LD optical pickups; motors for household appliances such as air conditioner compressors, refrigerator compressors, electric tools, fans, microwave oven fans, microwave oven plate rotation, mixer driving, dryer fans, shaver driving, and power toothbrushes; motors for factory automation equipment such as robot shafts, connection drives, robot drives, machine tool table drives, and machine tool belt drives; and miscellaneous units including motorcycle generators, speaker magnets, headphone magnets, magnetron tubes, MRI magnetic field generating systems, CD-ROM clamps, distributor sensors, ABS sensors, fuel/oil level sensors, and magnet latches.

EXAMPLE

Experiment

| The following powders were used as stock materials. | |
|---|---|
| $Fe_2O_3$ powder (primary particle diameter 0.3 μm, containing Mn, Cr, Si and Cl as impurities) | 1000.0 g |
| $SrCO_3$ powder (primary particle diameter 2 μm, containing Ba and Ca as impurities) | 130.3 g |
| cobalt oxide | 17.56 g |
| $La_2O_3$ | 35.67 g |
| The following powders were used as additives. | |
| $SiO_2$ powders (primary particles diameter 0.01 μm) | 2.30 g |
| $CaCO_3$ powder (primary particles diameter 1 μm) | 1.72 g |

The stock materials and additives were pulverized in a wet attritor, dried, sieved, and fired in air at 1,250° C. for 3 hours, obtaining a granular calcined material. The calcined material was measured for magnetic properties by means of a vibrating sample magnetometer (VSM), finding a saturation magnetization cys of 68 emu/g and a coercivity HcJ of 4.6 kOe.

The calcined material (110 g) was mixed with predetermined amounts of $SiO_2$ (0.44 g) and $CaCO_3$ (1.38 g), calcium gluconate (1.13 g) was added thereto, and the mixture was subjected to dry coarse pulverization for 20 minutes in a batchwise vibrating rod mill. At this point, strains were introduced by pulverization so that the HcJ of the calcined particles was reduced to 1.7 kOe.

This procedure was repeated twice. A pulverizing slurry was prepared by weighing 210 g of the coarsely pulverized material, adding 400 cc of water thereto as a dispersing medium, and mixing them. Pulverization was continued until the calcined material reached a specific surface area of 7 m²/g. The solids concentration of the pulverizing slurry was 34% by weight.

The wet pulverizing slurry was subjected to wet pulverization for 40 hours in a ball mill. A specific surface area of 8.5 m²/g (mean particle size 0.5 μm) was reached at the end of wet pulverization. The supernatant of the wet pulverized slurry was at pH 9 to 10.

After the wet pulverization, the pulverizing slurry was centrifuged until the concentration of calcined particles in the slurry reached about 78%, obtaining a shaping slurry. The shaping slurry was compacted while removing water therefrom. Compaction was effected under a magnetic field of about 13 kOe applied in the compression direction. The resulting compact was a cylinder having a diameter of 30 mm and a height of 18 mm. The compacting pressure was 0.4 ton/cm².

Next, the compact was hot worked at 100 to 360° C. for fully removing the gluconic acid. It was then fired in air by heating at a rate of 5° C./min and holding at 1,220° C. for one hour, obtaining a sintered body. The sintered body was observed under high-resolution TEM. Stacking fault portions and other portions were analyzed for composition by energy dispersive x-ray spectroscopy (EDS). An average of measurements at 10 points is shown below.

|  | Stacking fault portions (wt %) | Stacking fault-free portions (wt %) |
|---|---|---|
| $Fe_2O_3$ | 84.5 | 84.2 |
| SrO | 8.5 | 9.8 |
| $La_2O_3$ | 3.4 | 3.7 |
| CoO | 2.6 | 0.9 |
| $SiO_2$ | 0.8 | 1.0 |
| CaO | 0.2 | 0.4 |

Figure 2:
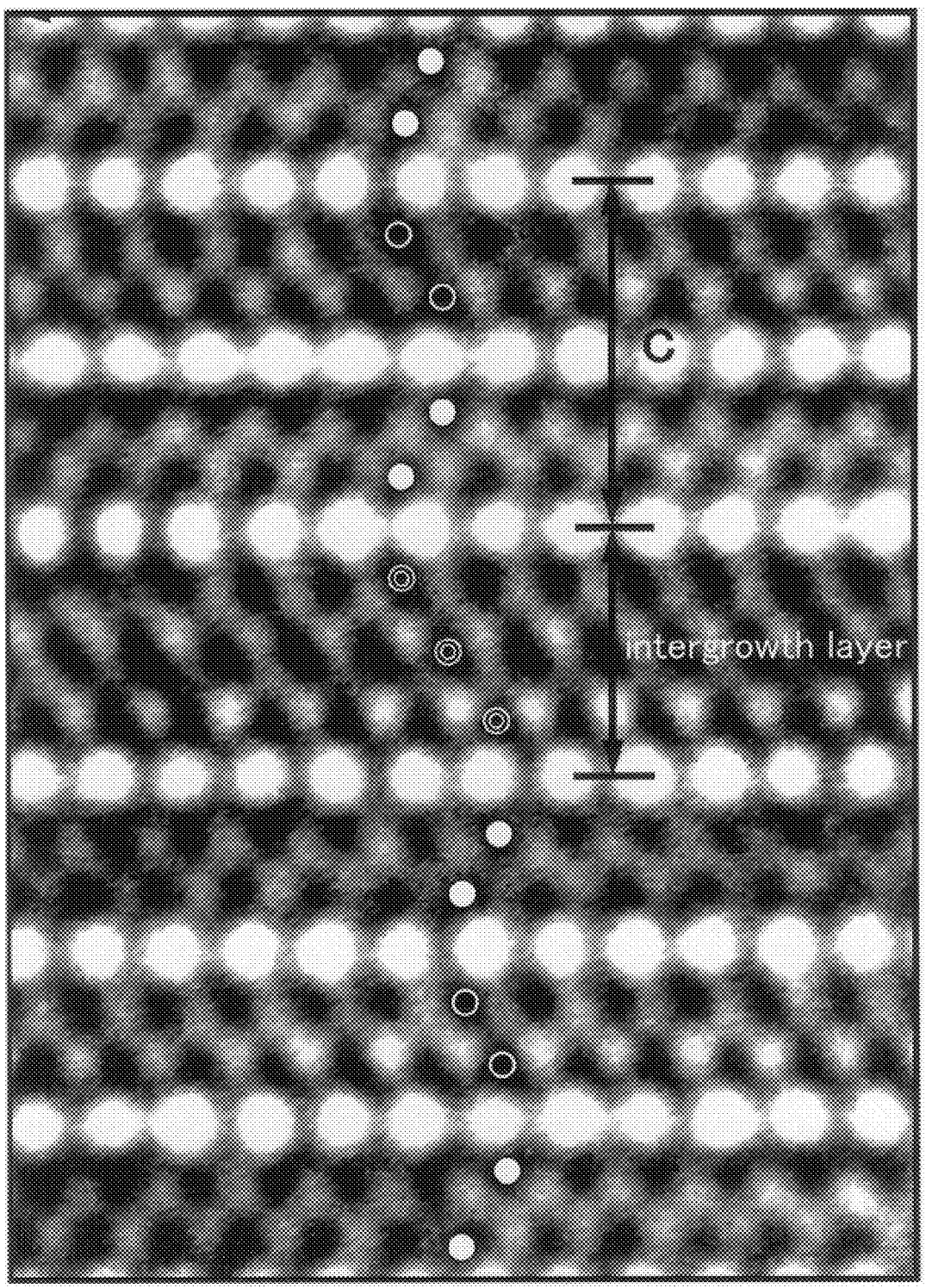
FIG. 2 is a TEM photomicrograph showing a faulty portion in Experiment.

Since the region of analysis (or spot size) by EDS is greater than the width of stacking faults, the composition of stacking fault portions is affected by the surrounding portions. Nevertheless, there was confirmed a definite tendency that more cobalt was present in the stacking fault portions. Further the stacking fault portion was carefully observed under a high-resolution transmission electron microscope (TEM). FIG. 1 shows the general crystal structure of the hexagonal ferrite magnet of the invention and FIG. 2 is a copy of a high-resolution TEM photomicrograph of the stacking fault portion. As shown in FIG. 1, the M type hexagonal ferrite has a structure of alternating S and R layers like the sequence of S layer/R layer/S* layer/R* layer. Herein, S* and R* mean that S and R are rotated 180 degrees about c-axis. However, it is seen from FIG. 2 that the stacking fault is a portion where periodicity is disordered. In FIG. 2, the region designated C represents the length (unit cell or unit lattice) corresponding to a lattice constant C. Since divalent ions such as Co are considered to enter the spinel layer, the high concentration of cobalt in the stacking fault portion is accounted for if the stacking fault is regarded an "intergrowth layer" in the spinel layer.

Example 1 (Sintered magnet: Sample 1 (aqueous system, post addition))

| The following powders were used as stock materials. | |
|---|---|
| $Fe_2O_3$ powder (primary particle diameter 0.3 μm, containing Mn, Cr, Si and Cl as impurities) | 1000.0 g |
| $SrCO_3$ powder (primary particle diameter 2 μm, containing Ba and Ca as impurities) | 161.2 g |

-continued

The following powders were used as additives.

| | |
|---|---|
| SiO$_2$ powder (primary particle diameter 0.01 μm) | 2.30 g |
| CaCO$_3$ powder (primary particle diameter 1 μm) | 1.72 g |

The stock materials and additives were pulverized in a wet attritor, dried, sieved, and fired in air at 1,250° C. for 3 hours, obtaining a granular calcined material.

The calcined material (87.26 g) was mixed with SiO$_2$ (0.44 g), CaCO$_3$ (1.38 g), lanthanum carbonate La$_2$(CO$_3$)$_3$·8H$_2$O (6.12 g), and cobalt oxide CoO (1.63 g). Further, calcium gluconate (1.13 g) was added thereto, and the mixture was subjected to dry coarse pulverization for 20 minutes in a batchwise vibrating rod mill. At this point, strains were introduced by pulverization so that the HcJ of the calcined particles was reduced to 1.7 kOe.

This procedure was repeated twice. A pulverizing slurry was prepared by weighing 177 g of the coarsely pulverized material, adding 37.25 g of the same iron oxide (α-Fe$_2$O$_3$) as the stock material, adding 400 cc of water thereto as a dispersing medium, and mixing them. Pulverization was continued until the calcined material reached a specific surface area of 7 m$^2$/g. The solids concentration of the pulverizing slurry was 34% by weight.

The wet pulverizing slurry was subjected to wet pulverization for 40 hours in a ball mill. A specific surface area of 8.5 m$^2$/g (mean particle size 0.5 μm) was reached at the end of wet pulverization. The wet pulverized slurry was at pH 9.5.

After the wet pulverization, the pulverizing slurry was centrifuged until the concentration of calcined particles in the slurry reached 78%, obtaining a shaping slurry. The shaping slurry was compacted while removing water therefrom. Compaction was effected under a magnetic field of about 13 kOe applied in the compression direction. The resulting compact was a cylinder having a diameter of 30 mm and a height of 18 mm. The compacting pressure was 0.4 ton/cm$^2$.

Next, the compact was hot worked at 100 to 300° C. for fully removing the gluconic acid. It was then fired in air by heating at a rate of 5° C./min and holding at 1,220° C. for one hour, obtaining a sintered body. The sintered body had a composition:

$$Sr_{0.8}La_{0.2}(Fe_{11.8}Co_{0.2})O_{19}.$$

Figure 3:
FIG. 3 is a first figure-replacement photomicrograph under TEM of the structure on a-plane of sintered magnet sample No. 1 according to the invention.
Figure 4:
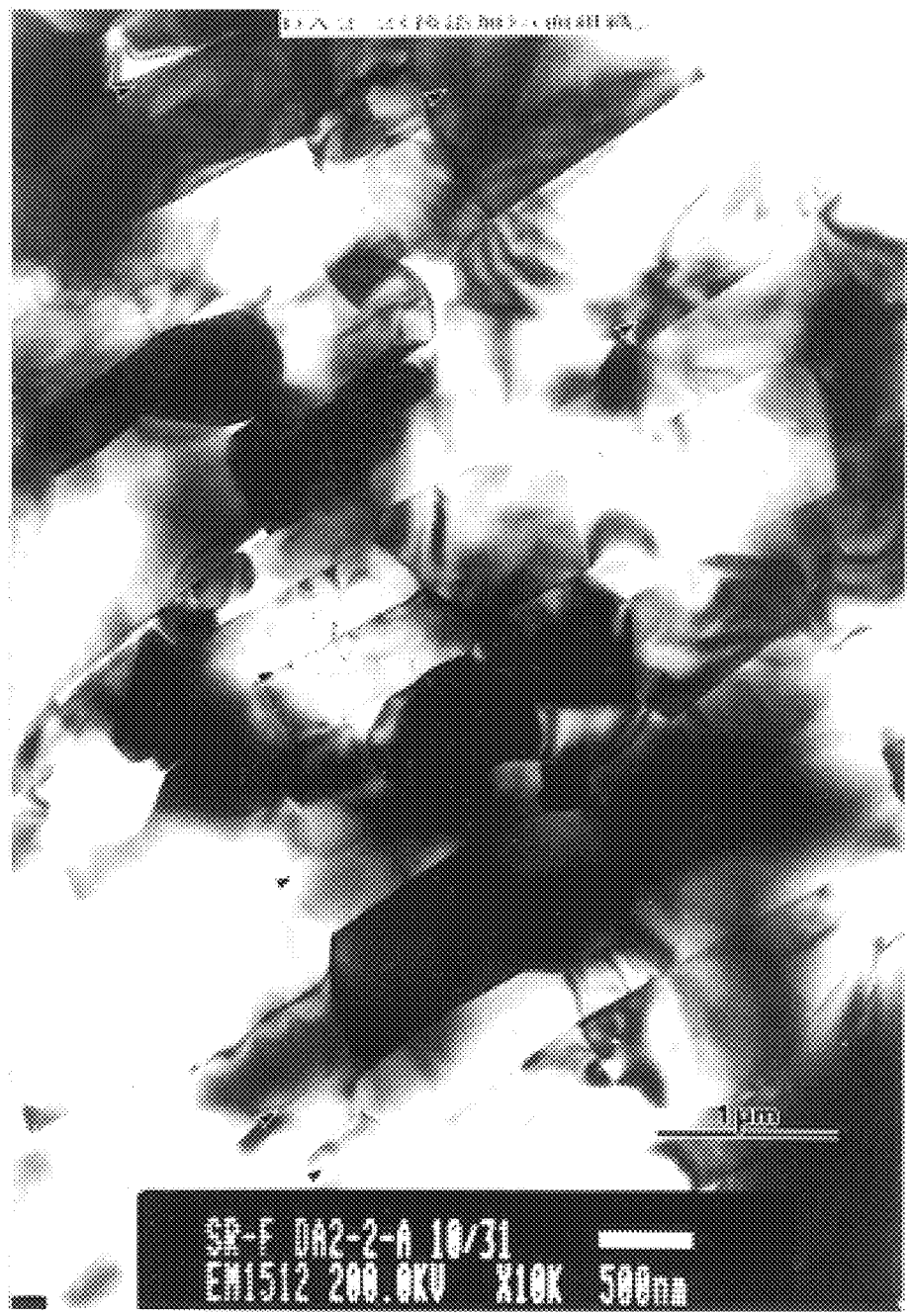
FIG. 4 is a second figure-replacement photomicrograph under TEM of the structure on a-plane of sintered magnet sample No. 1 according to the invention.
Figure 5:
FIG. 5 is an enlarged photograph of the upper half of FIG. 3.
Figure 6:
FIG. 6 is an enlarged photograph of the lower half of FIG. 3.
Figure 7:
FIG. 7 is an enlarged photograph of the upper half of FIG. 4.
Figure 8:
FIG. 8 is an enlarged photograph of the lower half of FIG. 4.
Figure 9:
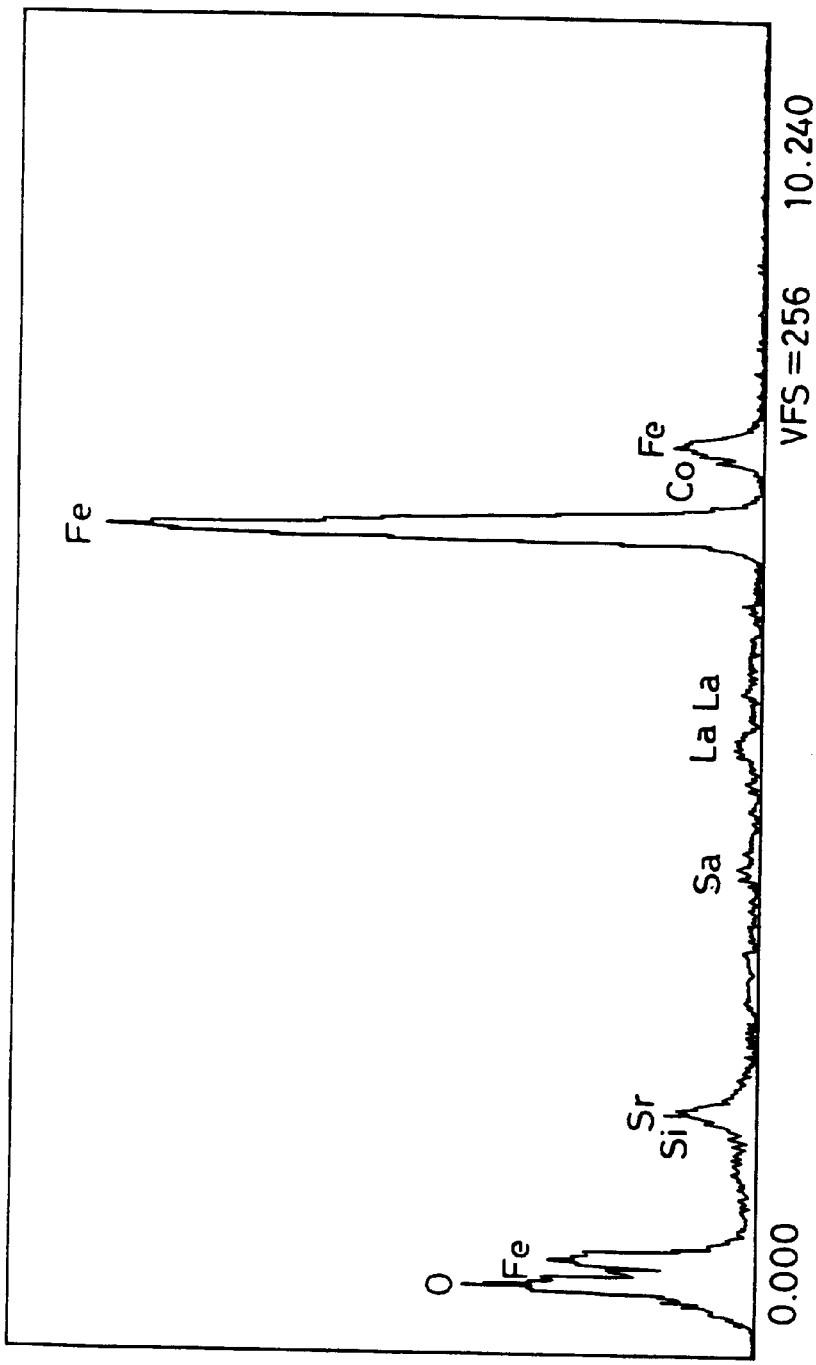
FIG. 9 is a diagram showing the result of elemental analysis by EDS at a grain boundary of sintered magnet sample No. 1 according to the invention.
Figure 10:
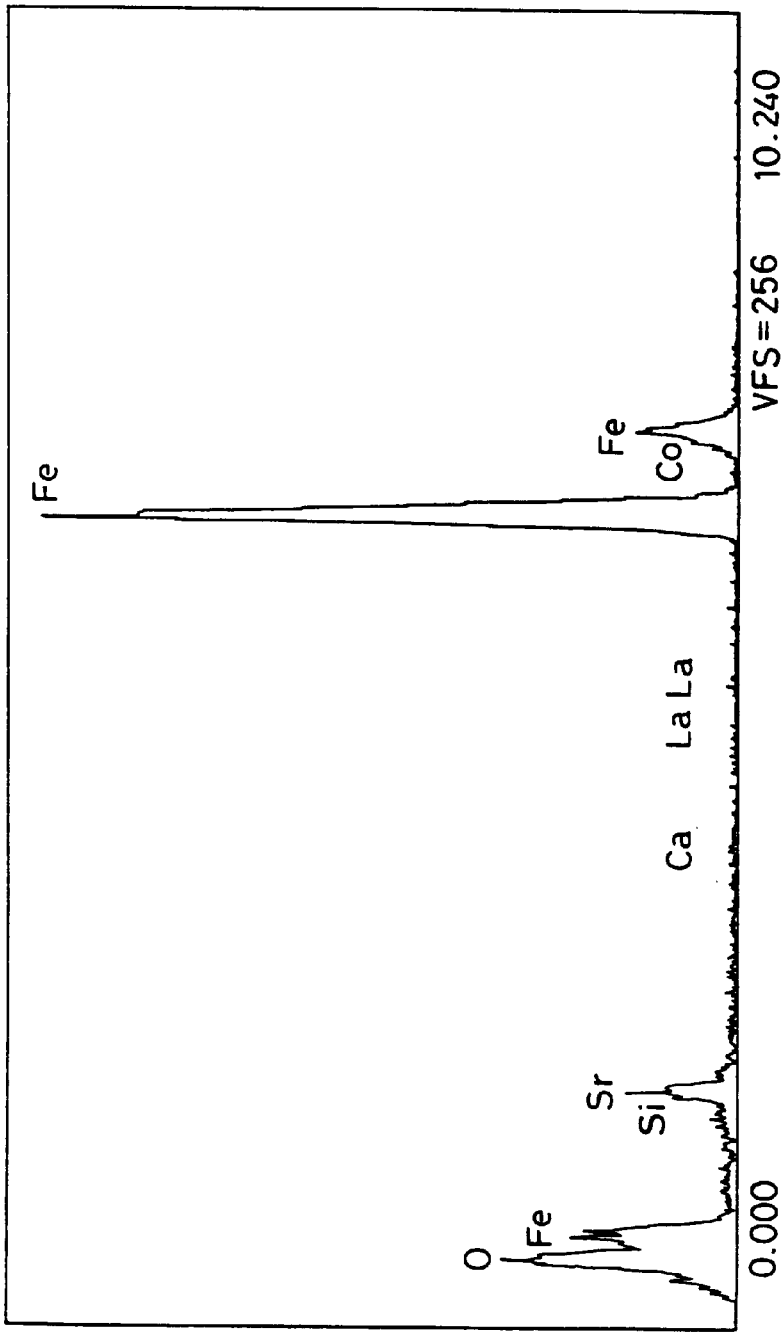
FIG. 10 is a diagram showing the result of elemental analysis by EDS at the crystal grain interior of sintered magnet sample No. 1 according to the invention.
Figure 11:
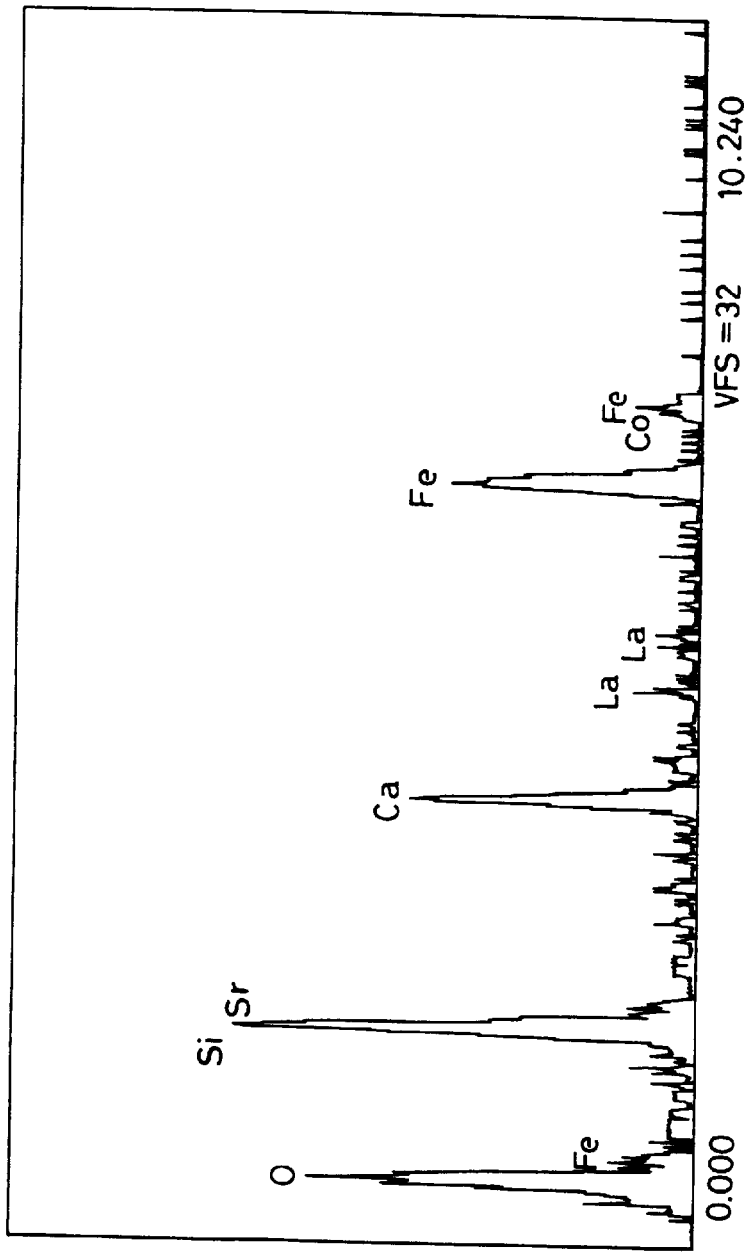
FIG. 11 is a diagram showing the result of elemental analysis by EDS at the triple point of sintered magnet sample No. 1 according to the invention.
Figure 12:
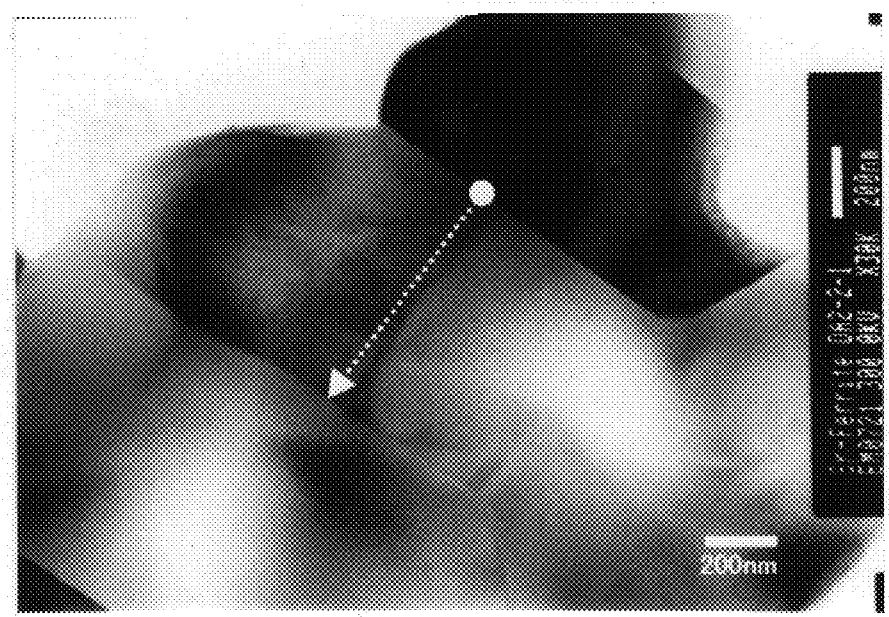
FIG. 12 is a TEM photomicrograph showing an arbitrary grain 1 as analyzed for $La_2O_3$ and CoO continuously from the grain boundary to the grain interior and then to the grain boundary.
Figure 14:
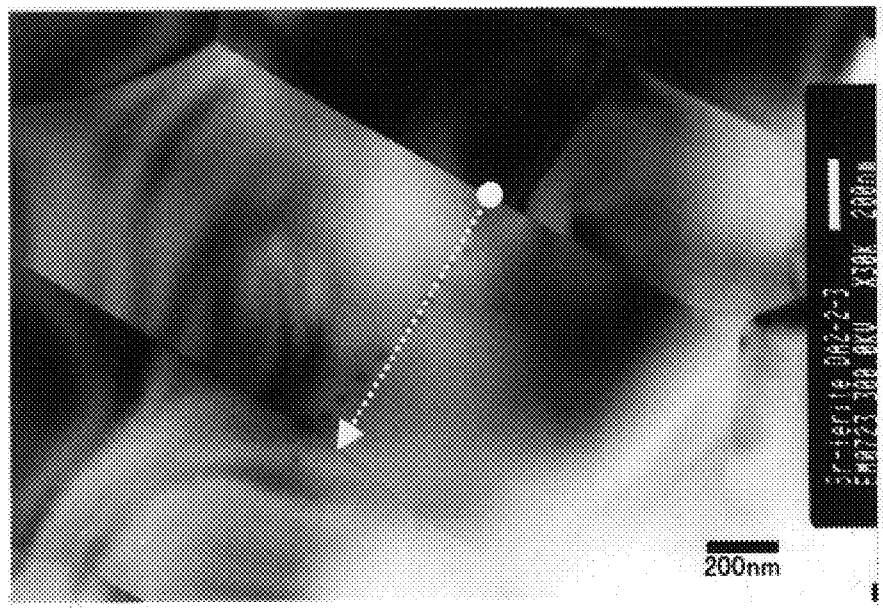
FIG. 14 is a TEM photomicrograph showing an arbitrary grain 3 as analyzed for $La_2O_3$ and CoO continuously from the grain boundary to the grain interior and then to the grain boundary.
Figure 13:
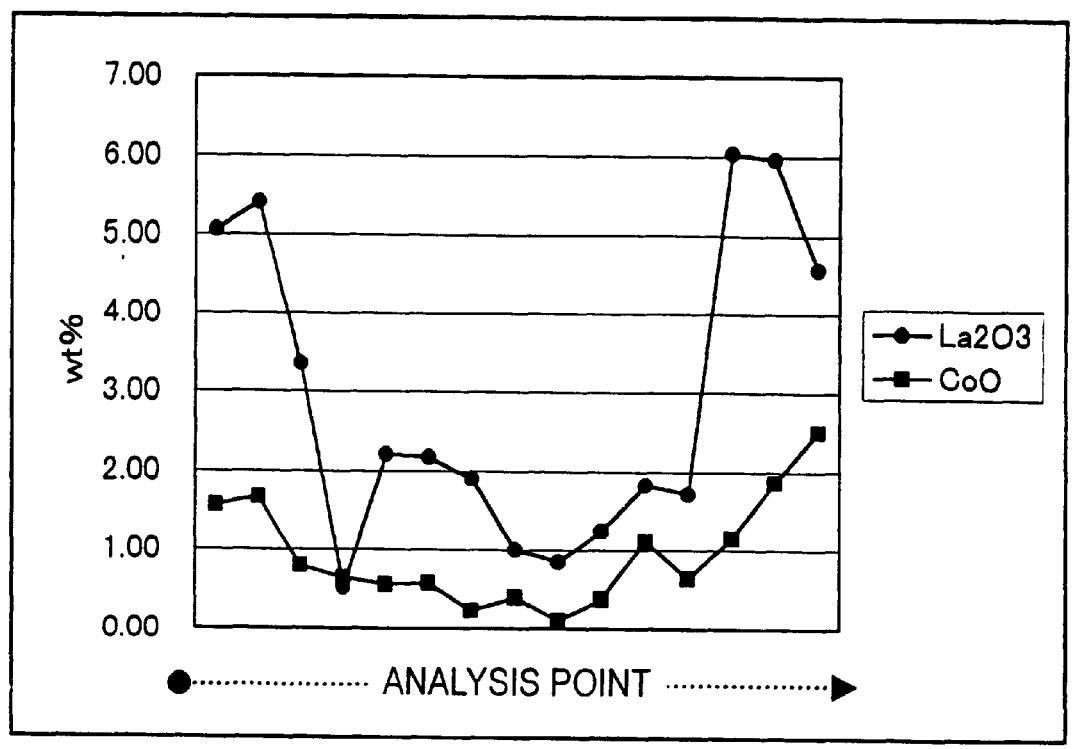
FIG. 13 is a graph showing the arbitrary grain 1 as analyzed for $La_2O_3$ and CoO continuously from the grain boundary to the grain interior and then to the grain boundary.
Figure 15:
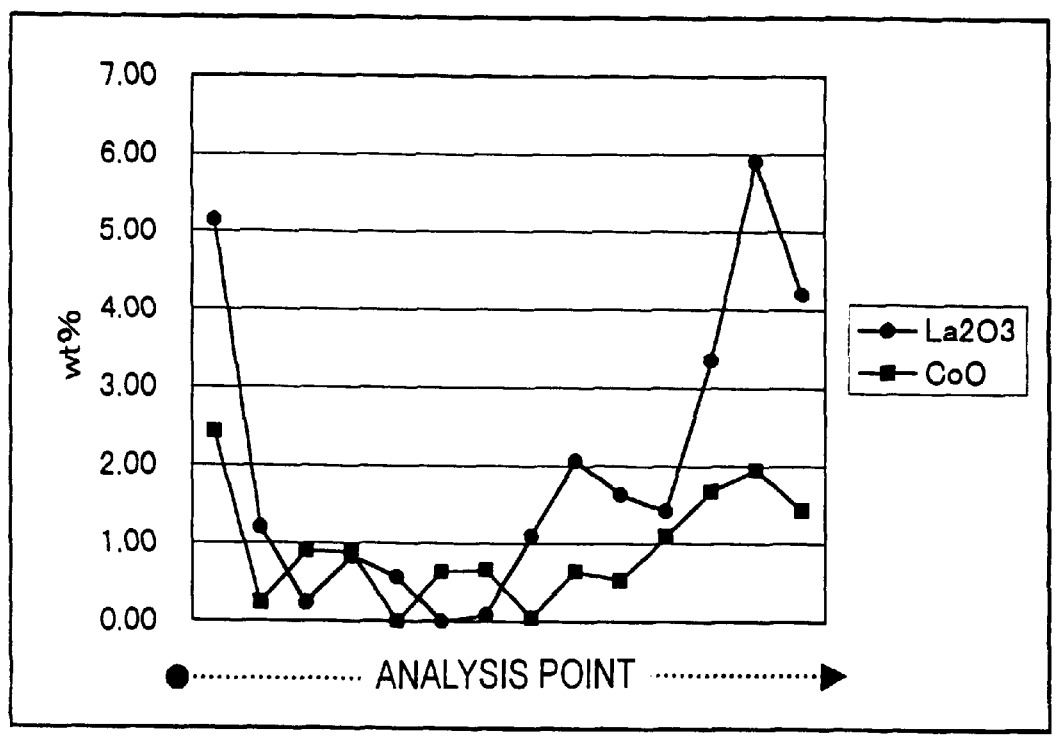
FIG. 15 is a graph showing the arbitrary grain 3 as analyzed for $La_2O_3$ and CoO continuously from the grain boundary to the grain interior and then to the grain boundary.

The texture structure on a-plane of the sintered body was observed under a transmission electron microscope (TEM). The magnification was 10,000× and two fields of view were inspected. As a result, the ratio of the number of stacking fault-bearing crystal grains (n) to the total number of crystal grains (N=80), that is, n/N was 9/80. FIGS. 3 and 4 are TEM photomicrographs of samples obtained. Enlarged photographs of these photographs are FIG. 5 (upper half) and FIG. 6 (lower half) and FIG. 7 (upper half) and FIG. 8 (lower half). Along with the TEM observation, component analysis was carried out by EDS, finding that few lanthanum atoms are present at the center within grains, but many are present in proximity to grain boundaries and in a triple point zone. The results of EDS analysis are illustrated in FIGS. 9 to 11. FIGS. 9, 10 and 11 illustrate the analytical results at the grain boundary, crystal grain interior and triple point, respectively. Randomly selected particles 1 and 3 under observation were analyzed for La$_2$O$_3$ and CoO continuously from the grain boundary to the grain interior and then to the grain boundary. The results are shown in FIGS. 12 and 13 and FIGS. 14 and 15. It was confirmed from these analytical results too that La and Co are present at higher concentrations in proximity to the grain boundary than in the grain interior. On analysis by x-ray diffractometry, the samples were found to have an M type ferrite single phase.

Furthermore, the sintered body was worked on its top and bottom surfaces before it was measured for remanence Br, coercivity HcJ and Hcb, maximum energy product (BH)max, saturation magnetization 4πIs, degree of magnetic orientation Ir/Is, and squareness Hk/HcJ. The results are shown in Table 1.

The sample was worked to a diameter of 5 mm and a height of 6.5 mm. Using a VSM, the temperature dependency of magnetization in the c-axis direction was measured, from which Curie temperature Tc was determined. As a result, Sample No. 1 within the scope of the invention was found to have two different Curie temperatures Tc of 440° C. and 456° C.

TABLE 1

| Sample No. | 4πIs (kG) | Br (kG) | HcJ (kOe) | Ir/Is (%) | Hk/HcJ (%) | (BH)max (MGOe) | Sintered density (g/cm$^3$) |
|---|---|---|---|---|---|---|---|
| 1 | 4.47 | 4.34 | 4.60 | 97.2 | 91.7 | 4.6 | 5.02 |
| 2* | 4.52 | 4.33 | 4.61 | 95.8 | 89.5 | 4.5 | 5.06 |

*comparative sample

Example 2

The compacts prepared by the procedure of Example 1 were fired at an oxygen concentration of 1%, 20% and 50%. As in Example 1, they were measured for magnetic properties, Curie temperature, and temperature coefficient of Br. The results are shown in Table 2.

TABLE 2

| Sample No. | Firing temperature (° C.) | Atmosphere O$_2$ % | 4πIs (G) | Br (G) | HcJ (Oe) | Hcb (Oe) | Ir/Is (%) | Hk/HcJ (%) | (BH)max (MGOe) |
|---|---|---|---|---|---|---|---|---|---|
| 11 | 1220 | 1 | 4495 | 4360 | 3589 | 3073 | 96.99 | 70.52 | 4.60 |
| 12 | 1220 | 22 | 4458 | 4321 | 4648 | 4101 | 96.92 | 92.77 | 4.57 |
| 13 | 1220 | 50 | 4409 | 4266 | 4960 | 4095 | 96.75 | 93.22 | 4.46 |

TABLE 2-continued

| Sample No. | Density (g/cm³) | Shrinkage factor | Curie temperature Tc1 (° C.) | Curie temperature Tc2 (° C.) | Temperature coefficient of Br |
|---|---|---|---|---|---|
| 11 | 5.02 | 2.16 | 442 | 460 | −0.190 |
| 12 | 5.00 | 1.98 | 442 | 458 | −0.191 |
| 13 | 4.98 | 2.03 | 441 | 457 | −0.192 |

As seen from Table 2, the magnetic properties of sintered bodies improve as the concentration of oxygen increases.

Figure 16:
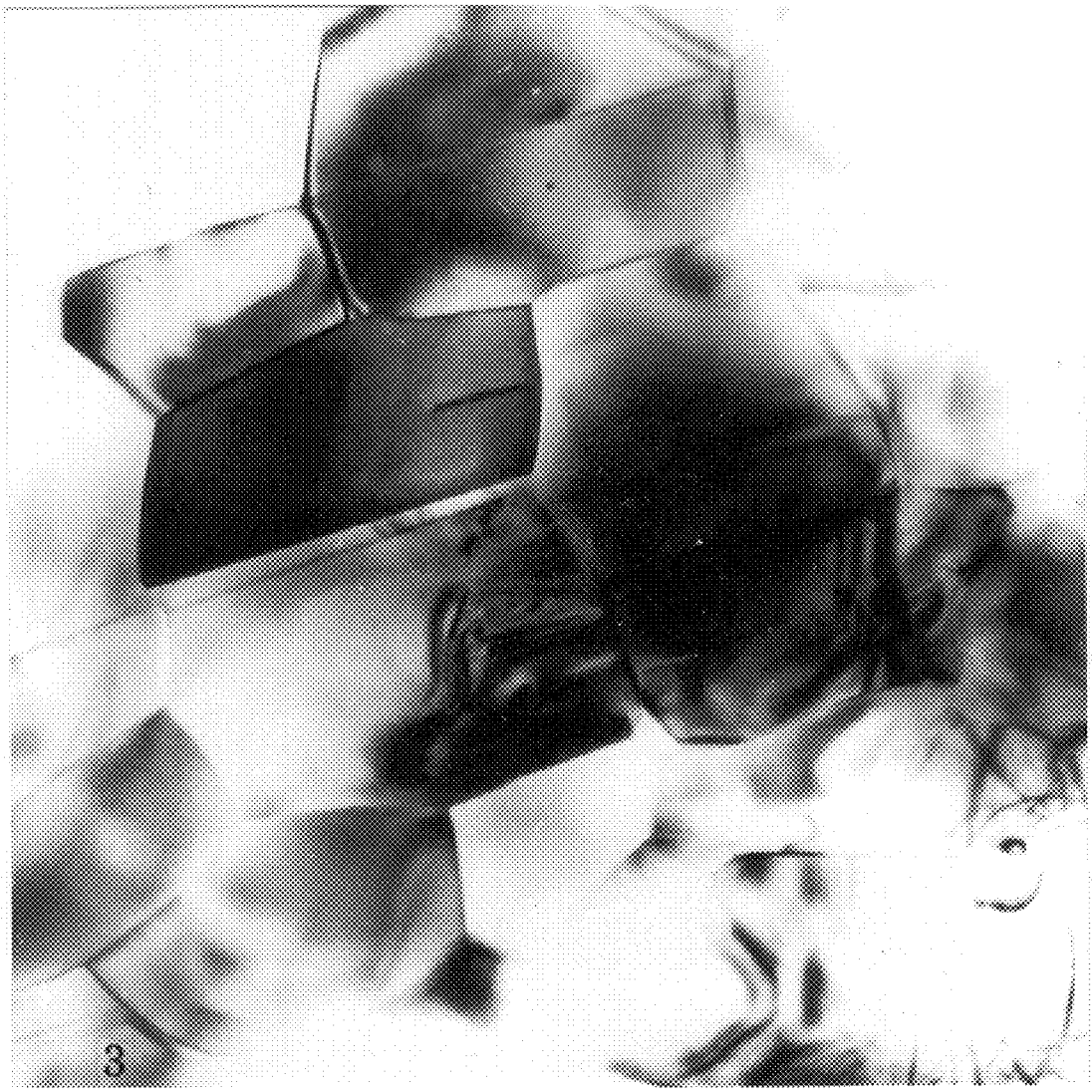
FIG. 16 is a TEM photomicrograph of a sintered body obtained in a firing atmosphere containing 1% of $O_2$ in Example 2.
Figure 17:
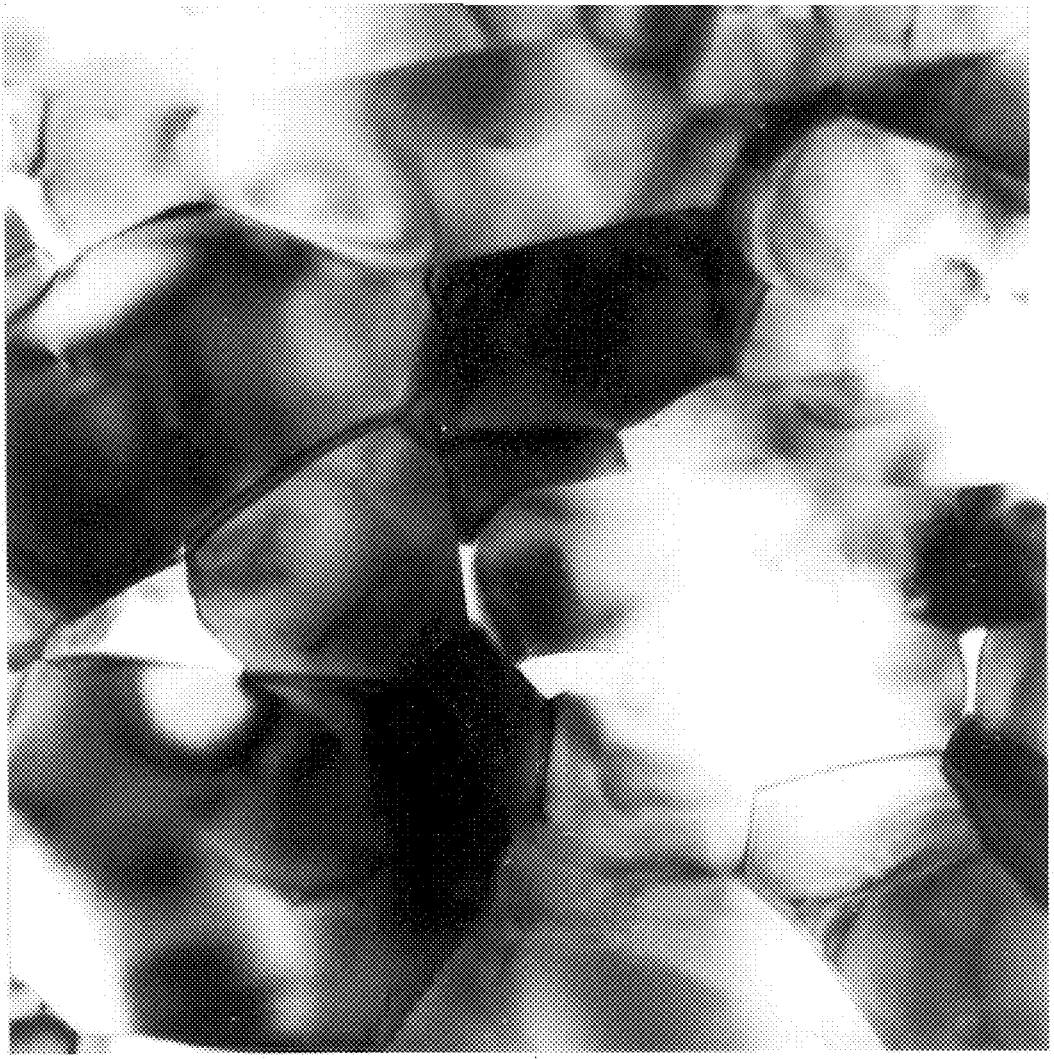
FIG. 17 is a TEM photomicrograph of a sintered body obtained in a firing atmosphere containing 20% of $O_2$ in Example 2.

The sintered bodies obtained in the firing atmosphere containing 1% and 20% $O_2$ were observed under TEM. The results are shown in FIGS. 16 and 17. As seen from FIGS. 16 and 17, faults increase at a lower oxygen concentration.

Comparative Example 1 (Sintered magnet: Sample 2 (solvent system, pre-addition))

The following powders were used as stock materials.

| | |
|---|---|
| $Fe_2O_3$ powder (primary particle diameter 0.3 μm, containing Mn, Cr, Si and Cl as impurities) | 1000.0 g |
| $SrCO_3$ powder (primary particle diameter 2 μm, containing Ba and Ca as impurities) | 130.3 g |
| cobalt oxide | 17.56 g |
| $La_2O_3$ | 35.67 g |
| The following powders were used as additives. | |
| $SiO_2$ powder (primary particle diameter 0.01 μm) | 2.30 g |
| $CaCO_3$ powder (primary particle diameter 1 μm) | 1.72 g |

The stock materials and additives were pulverized in a wet attritor, dried, sieved, and fired in air at 1,250° C. for 3 hours, obtaining a granular calcined material. The calcined material was measured for magnetic properties by means of a vibrating sample magnetometer (VSM), finding a saturation magnetization as of 68 emu/g and a coercivity HcJ of 4.6 kOe.

The calcined material (110 g) was mixed with predetermined amounts of $SiO_2$ (0.44 g) and $CaCO_3$ (1.38 g), and the mixture was subjected to dry coarse pulverization for 20 minutes in a batchwise vibrating rod mill. At this point, strains were introduced by pulverization so that the HcJ of the calcined particles was reduced to 1.7 kOe.

Next, using xylene as a non-aqueous solvent and oleic acid as a surfactant, the calcined powder was subjected to wet pulverization in a ball mill for 40 hours. The amount of oleic acid added was 1.3% by weight based on the calcined powder. The calcined powder in the slurry was 33% by weight. Pulverization was continued until a specific surface area of 8 to 9 m²/g was reached.

After the wet pulverization, the pulverizing slurry was centrifuged until the concentration of ferrite particles in the slurry reached about 85%, obtaining a shaping slurry. The shaping slurry was compacted while removing the solvent therefrom. Compaction was effected under a magnetic field of about 13 kOe applied in the compression direction. The resulting compact was a cylinder having a diameter of 30 mm and a height of 18 mm. The compacting pressure was 0.4 ton/cm².

Next, the compact was hot worked at 100 to 360° C. for fully removing the oleic acid. It was then fired in air by heating at a rate of 5° C./min and holding at 1,220° C. for one hour, obtaining a sintered body. The sintered body had a composition:

$$Sr_{0.8}La_{0.2}(Fe_{11.8}Co_{0.2})O_{19}.$$

Figure 18:
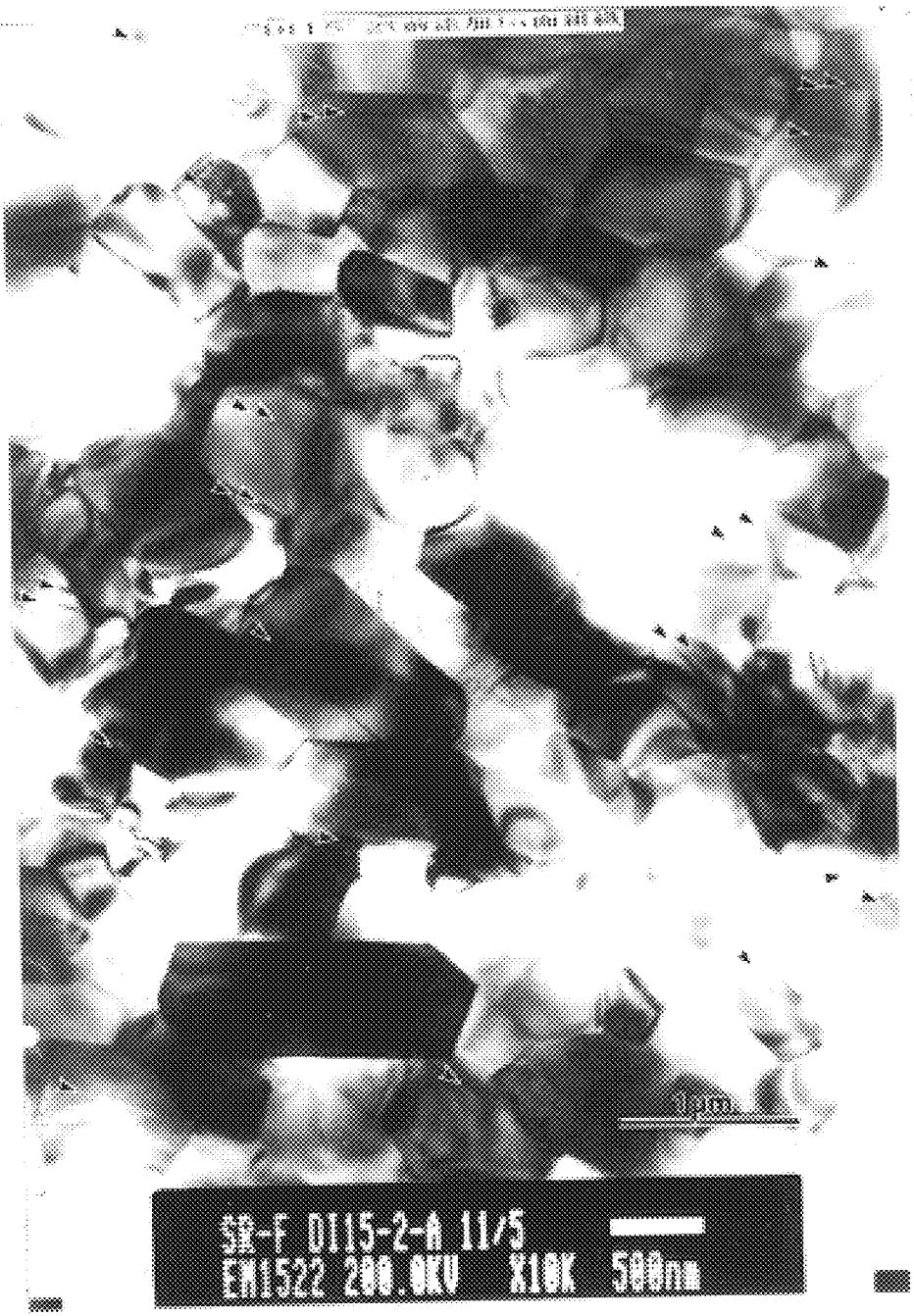
FIG. 18 is a first figure-replacement photomicrograph under TEM of the structure on a-plane of sintered magnet sample No. 2 in Comparative Example 1.
Figure 19:
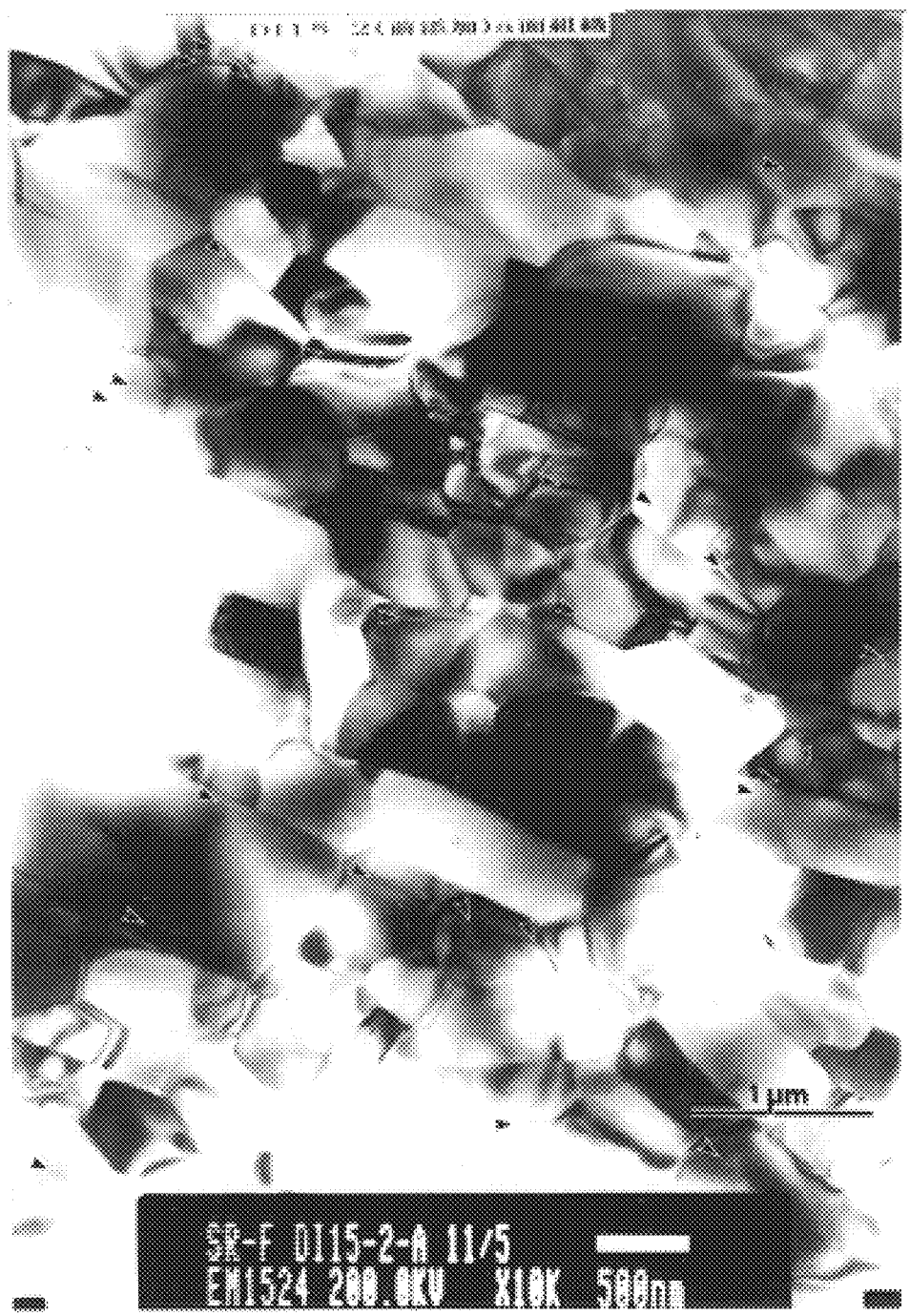
FIG. 19 is a second figure-replacement photomicrograph under TEM of the structure on a-plane of sintered magnet sample No. 2 in Comparative Example 1.
Figure 20:
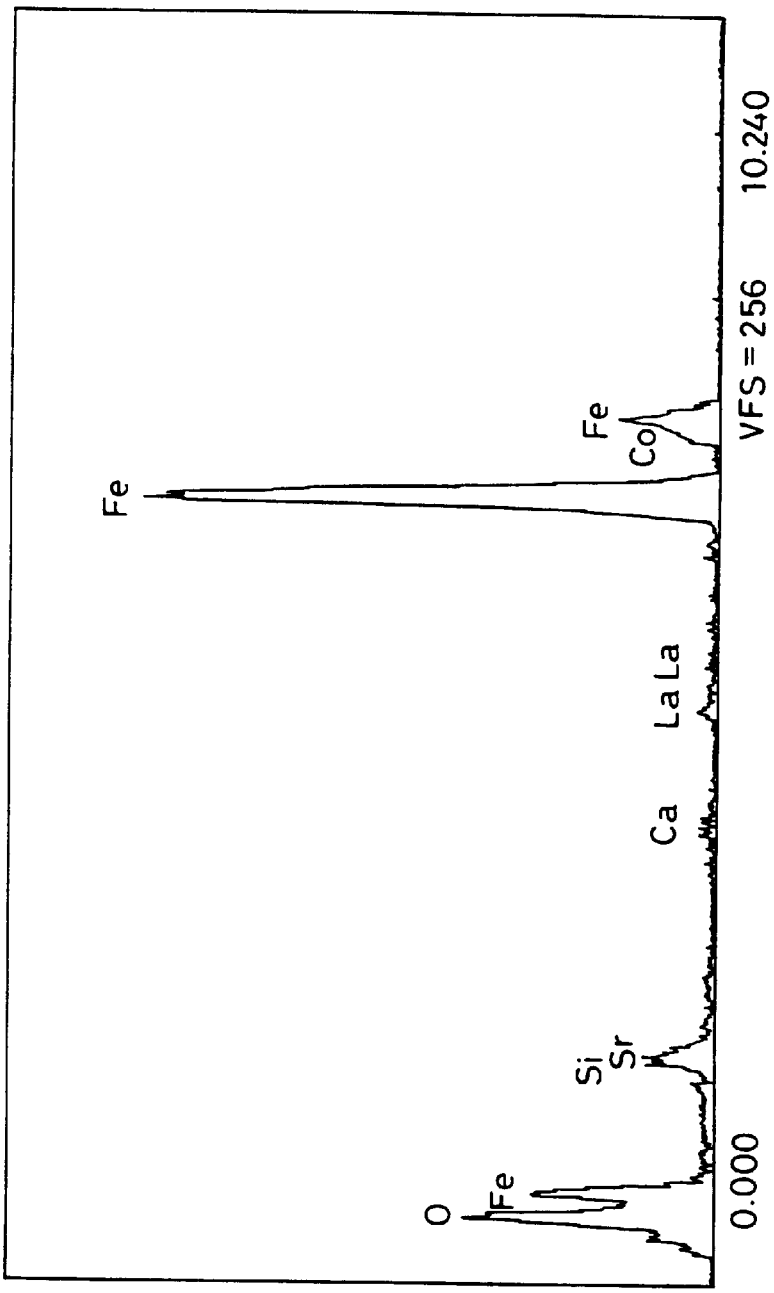
FIG. 20 is a diagram showing the result of elemental analysis by EDS at a grain boundary of sintered magnet sample No. 2 in Comparative Example 1.
Figure 21:
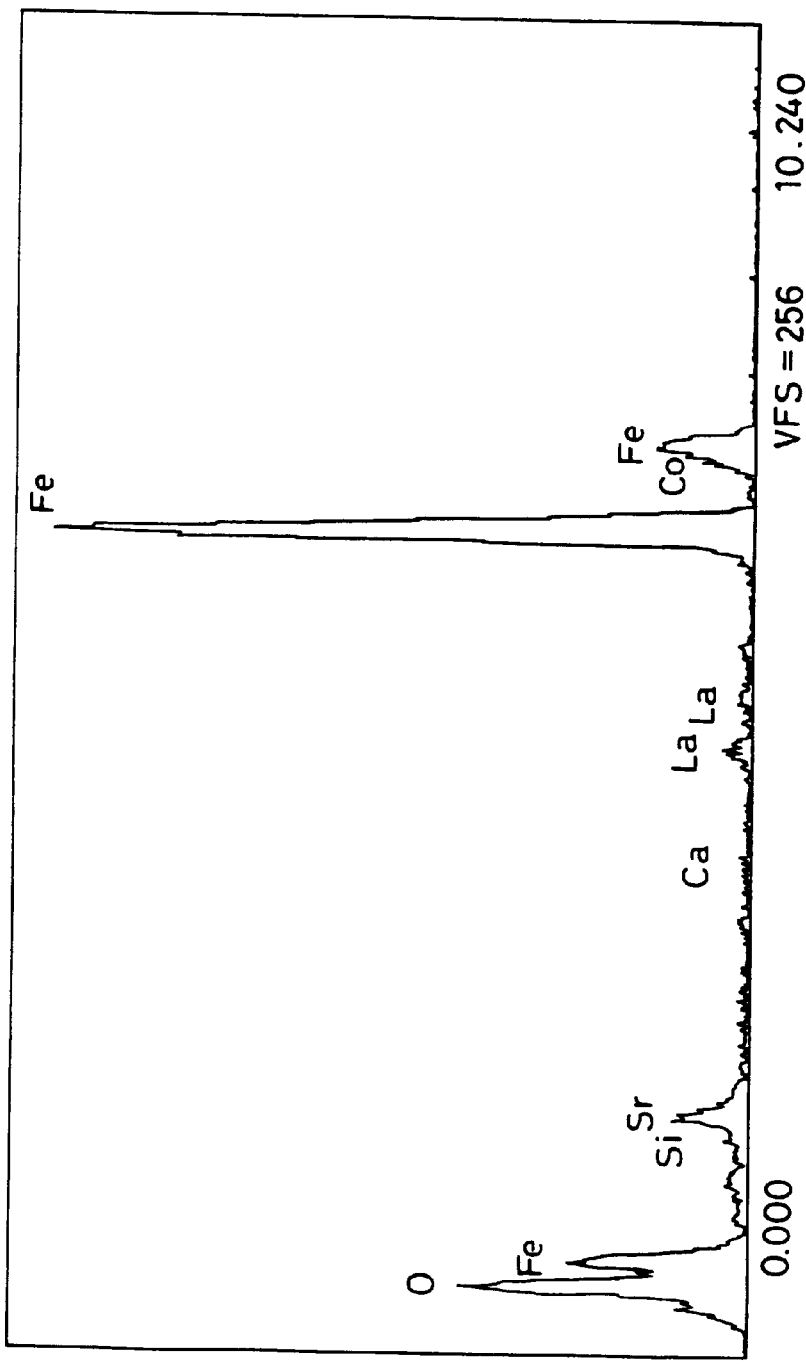
FIG. 21 is a diagram showing the result of elemental analysis by EDS at the crystal grain interior of sintered magnet sample No. 2 in Comparative Example 1.
Figure 22:
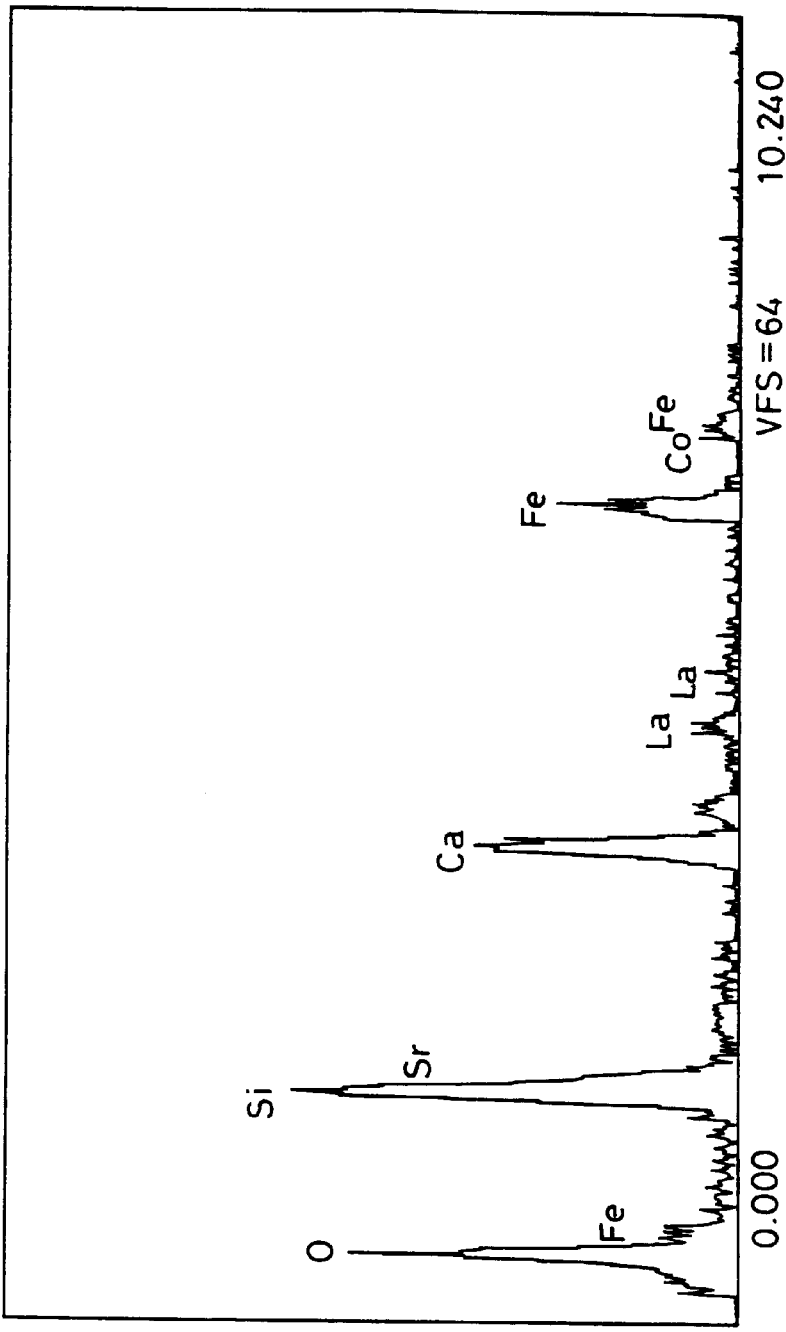
FIG. 22 is a diagram showing the result of elemental analysis by EDS at the triple point of sintered magnet sample No. 2 in Comparative Example 1.

The sintered body was observed under TEM as was Sample No. 1. As a result, the ratio of the number of stacking fault-bearing crystal grains (n) to the total number of crystal grains (N=120), that is, n/N was 50/120. FIGS. 18 and 19 are TEM photomicrographs of samples obtained. Along with the TEM observation, component analysis was carried out by EDS, finding that the lanthanum concentration remained substantially unchanged among the crystal grain interior, grain boundary proximity and triple point. The results are illustrated in FIGS. 20 to 22. FIGS. 20, 21 and 22 illustrate the analytical results at the grain boundary, crystal grain interior and triple point, respectively. It was confirmed from these analytical results that the amount of lanthanum in the crystal grain interior becomes reduced by the post-addition method in Example. On analysis by x-ray diffractometry, the samples were found to have an M type ferrite single phase.

Furthermore, the sintered body was worked on its top and bottom surfaces before it was measured for remanence Br, coercivity HcJ and HcB, maximum energy product (BH) max, saturation magnetization 4πIs, degree of magnetic orientation Ir/Is, and squareness Hk/HcJ. The results are shown in Table 1.

The sample was worked to a diameter of 5 mm and a height of 6.5 mm. Using a VSM, the temperature dependency of magnetization in the c-axis direction was measured, from which Curie temperature Tc was determined. As a result, Comparative Sample No. 2 was found to have a single Curie temperatures Tc of 444° C.

Comparative Example 2 (Sintered magnet: Sample 3 (Zn-containing solvent system. pre-addition))

A sintered body was prepared as in Comparative Example 1 except that the stock materials were changed so that zinc was contained instead of cobalt and the final composition became

$$Sr_{0.8}R_{0.3}(Fe_{11.7}Zn_{0.3})O_{19}$$

wherein R is La, Ce, Pr, Nd or Sm. The sintered body was observed under TEM as was Sample No. 1. As a result, the ratio of the number of stacking fault-bearing crystal grains (n) to the total number of crystal grains (N), that is, n/N was from 0.6 to 0.8. There were found many crystal grains that each contained three or more stacking faults. Stacking fault portions and other portions were analyzed for composition by TEM-EDS. An average of measurements at 10 points is shown below.

|  | Stacking fault portions (wt %) | Stacking fault-free portions (wt %) |
| --- | --- | --- |
| $Fe_2O_3$ | 83.99 | 84.65 |
| SrO | 6.49 | 7.22 |
| $La_2O_3$ | 5.22 | 6.13 |
| ZnO | 4.30 | 2.00 |

Figure 23:
FIG. 23 is a TEM photomicrograph of a sample No. 3 obtained in Comparative Example 2.
Figure 24:
FIG. 24 is a TEM photomicrograph of a sample No. 3 obtained in Comparative Example 2.
Figure 25:
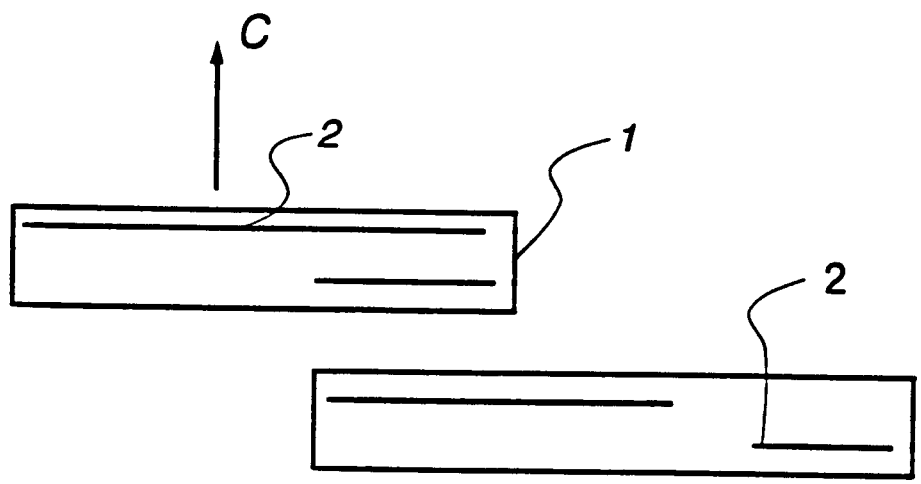
FIG. 25 is a schematic diagram showing crystal grains and the state of stacking faults therein.

It was found that more zinc was present in the stacking fault portion. FIGS. 23 and 24 are TEM photomicrographs of these samples.

Comparative Example 3

Sintered bodies were prepared as in Comparative Example 1 except that the sintered bodies had the composition:

$$Sr_{1-x}La_xFe_{12-x}Co_xO_{19}$$

wherein x=0, 0.1, 0.2, 0.3, 0.4, and 0.6. They were observed under TEM. As seen from Table 3 reporting the stacking fault proportion, the proportion of stacking fault-bearing grains increases as the contents of La and Co increase (that is, x increases). It was also found that these stacking fault portions had a high cobalt concentration.

TABLE 3

| Sample No. | Fault proportion |
| --- | --- |
| 21 | 0/30 |
| 22 | 3/30 |
| 23 | 12/30 |
| 24 | 15/30 |
| 25 | 25/30 |
| 26 | 29/30 |

The sintered bodies were measured for magnetic properties as in Comparative Example 1. The results are shown in Table 4. The magnetic properties (especially HcJ) of the sintered bodies improve with an increase of x in the range of x from 0 to 0.3, but deteriorate with an increase of x when x is 0.4 or greater. It is believed that this results from the improvement in properties by the inclusion of La and Co combined with the deterioration in properties by an increase of the stacking fault proportion. It is thus believed that the effect of La and Co is further increased by suppressing the stacking fault proportion low.

TABLE 4

| Sample No. | X | 4πIs (G) | Br (G) | HcJ (Oe) | HcB (Oe) | Ir/Is (%) | Hk/HcJ (%) | (BH) max (MGOe) | Density (g/cm³) |
| --- | --- | --- | --- | --- | --- | --- | --- | --- | --- |
| 21 | 0 | 4501 | 4388 | 3772 | 3500 | 97.48 | 90.29 | 4.73 | 4.98 |
| 22 | 0.1 | 4534 | 4434 | 4328 | 3912 | 97.79 | 90.24 | 4.82 | 4.97 |
| 23 | 0.2 | 4553 | 4431 | 4581 | 3991 | 97.32 | 86.61 | 4.84 | 5.02 |
| 24 | 0.3 | 4559 | 4446 | 4822 | 4010 | 97.52 | 82.95 | 4.86 | 5.04 |
| 25 | 0.4 | 4564 | 4449 | 4178 | 3613 | 97.45 | 80.78 | 4.81 | 5.06 |
| 26 | 0.6 | 4165 | 3988 | 2857 | 2691 | 95.75 | 88.58 | 3.79 | 4.65 |

Comparative Example 4

Sintered bodies were prepared as in Comparative Example 1 except that the sintered bodies had the compositions:

$Sr_{0.7}La_{0.3}Fe_{11.7}Ni_{0.3}O_{19}$,
$Sr_{0.8}La_{0.2}Fe_{11.8}Mn_{0.2}O_{19}$,
$Sr_{0.8}La_{0.2}Fe_{11.8}Cu_{0.2}O_{19}$,
$SrFe_{11.7}Co_{0.3}O_{19}$, and
$SrFe_{11.6}Ti_{0.2}O_{19}$.

They were analyzed by TEM-EDS. As a result, it was found that similar faults were present in the samples except for $Sr_{0.8}La_{0.2}Fe_{11.8}Mn_{0.2}O_{19}$ and that element M of the sintered body was present at a high concentration in the fault portions.

The effectiveness of the invention is evident from the foregoing Examples.

BENEFITS

The invention is successful in simultaneously increasing the saturation magnetization and magnetic anisotropy of M type ferrite, thereby realizing a hexagonal ferrite magnet having a high remanence and high coercivity which could never be achieved in prior art M type hexagonal ferrite magnets.

What is claimed is:

1. A hexagonal ferrite magnet comprising A, R, and Fe, wherein A represents at least one element selected from the group consisting of strontium, barium, and calcium, and R represents an element capable of assuming a valence of +3 or +4 and having an ionic radius of at least 1.00 angstrom,
    provided that N is the total number of crystal grains and n is the number of crystal grains having stacking faults, n/N is up to 0.35.

2. The hexagonal ferrite magnet of claim 1 further comprising M which represents an element having an ionic radius of up to 0.90 angstrom.

3. The hexagonal ferrite magnet of claim 1 which contains 0.05 to 10 at % of R.

4. The hexagonal ferrite magnet of claim 2 wherein the proportions of the respective metal elements A, R, Fe, and M, each in total, are:
    A: 1 to 13 at %,
    R: 0.05 to 10 at %,
    Fe: 80 to 95 at %, and
    M: 0.1 to 5 at %,
based on the entire amount of the metal elements.

5. The hexagonal ferrite magnet of claim 2 wherein a portion of stacking fault has a higher content of element M than the remaining portion of each crystal grain.

6. The hexagonal ferrite magnet of claim 1 wherein R is at least one element selected from the group consisting of La, Pr, Nd, and Ce.

7. The hexagonal ferrite magnet of claim 2 wherein M is an element capable of forming a divalent ion.

8. The hexagonal ferrite magnet of claim 2 wherein M is at least one element selected from the group consisting of Co, Ni, and Zn.

9. The hexagonal ferrite magnet of claim 1 which is a magnetoplumbite type ferrite.

10. A hexagonal ferrite magnet comprising A, R, and Fe, wherein A represents at least one element selected from the group consisting. of strontium, barium, and calcium, and R represents an element capable of assuming a valence of +3 or +4 and having an ionic radius of at least 1.00 angstrom, more R is present in proximity to grain boundaries than at the center of crystal grains.

11. The hexagonal ferrite magnet of claim 10 further comprising M which represents an element having an ionic radius of up to 0.90 angstrom.

12. The hexagonal ferrite magnet of claim 11 wherein more M is present in proximity to grain boundaries than at the center of crystal grains.

13. The hexagonal ferrite magnet of claim 10 which contains 0.05 to 10 at % of R.

14. The hexagonal ferrite magnet of claim 11 wherein the proportions of the respective metal elements A, R, Fe, and M, each in total, are:

A: 1 to 13 at %,
R: 0.05 to 10 at %,
Fe: 80 to 95 at %,
M: 0.1 to 5 at %, based on the entire amount of the metal elements.

15. The hexagonal ferrite magnet of claim 10 wherein R is at least one element selected from the group consisting of La, Pr, Nd, and Ce.

16. The hexagonal ferrite magnet of claim 11 wherein M is an element capable of forming a divalent ion.

17. The hexagonal ferrite magnet of claim 11 wherein M is at least one element selected from the group consisting of Co, Ni, and Zn.

18. The hexagonal ferrite magnet of claim 10 which is a magnetoplumbite type ferrite.

19. The hexagonal ferrite magnet of claim 1 wherein n/N is from 0.05 to 0.35.

20. The hexagonal ferrite magnet of claim 10 wherein n/N is from 0.05 to 0.35.

* * * * *